US006591184B2

(12) United States Patent
Yonezawa et al.

(10) Patent No.: US 6,591,184 B2
(45) Date of Patent: Jul. 8, 2003

(54) CYLINDER IDENTIFYING SYSTEM FOR INTERNAL COMBUSTION ENGINE

(75) Inventors: Shiro Yonezawa, Tokyo (JP); Atsuko Hashimoto, Tokyo (JP); Hirofumi Ohuchi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 266 days.

(21) Appl. No.: 09/846,392

(22) Filed: May 2, 2001

(65) Prior Publication Data

US 2002/0045984 A1 Apr. 18, 2002

(30) Foreign Application Priority Data

Oct. 18, 2000 (JP) .......................................... 2000-317930

(51) Int. Cl.[7] ................................................ G06F 19/00

(52) U.S. Cl. ........................ 701/113; 701/114; 701/115; 123/406.62

(58) Field of Search ................................ 701/102, 113, 701/114, 111, 115; 73/117.3; 123/406.62, 406.58, 406.18, 406.63

(56) References Cited

U.S. PATENT DOCUMENTS 5,263,450 A * 11/1993 Hashimoto et al. ..... 123/406.62
5,309,757 A * 5/1994 Hashimoto et al. ........... 73/116
5,890,078 A * 3/1999 Furuta ......................... 701/104
5,935,189 A * 8/1999 Park ........................... 73/117.3
6,446,602 B1 * 9/2002 Yonezawa et al. ...... 123/406.62

FOREIGN PATENT DOCUMENTS

JP 6-146992 5/1994 ........... F02D/45/00
JP 11-311146 11/1999 ........... F02D/45/00

OTHER PUBLICATIONS

Abstract, 06–146992, May 27, 1994.
Abstract, 11–311146, Nov. 9, 1999.

* cited by examiner

*Primary Examiner*—Hieu T. Vo
(74) *Attorney, Agent, or Firm*—Sughrue Mion, PLLC

(57) ABSTRACT

A cylinder identifying system for an internal combustion engine enables fuel injection and ignition controls for individual cylinders to be speedily performed upon starting of engine. A cylinder identifying means (10) operating on the basis of a crank angle signal (SGT) and a cam signal (SGC) includes a pulse signal number storage means (12) for dividing an ignition control period of each cylinder into plural subperiods for counting for storage signal numbers of specific pulses generated over plural subperiods, and a subperiod discriminating means (14) for determining discriminatively a sequential order of the plural subperiods on the basis of combinations of the numbers of the specific pulses generated during the plural subperiods. The combinations of the numbers of specific pulses generated during the plural subperiods differ one another correspondingly to the plural subperiods independently from the start points thereof. The cylinder identifying means (10) identifies the individual cylinders on the basis of results of determination made by the subperiod discriminating means (14) independently of positional relationships between the storage start points and the subperiods.

9 Claims, 13 Drawing Sheets

FIG. 3
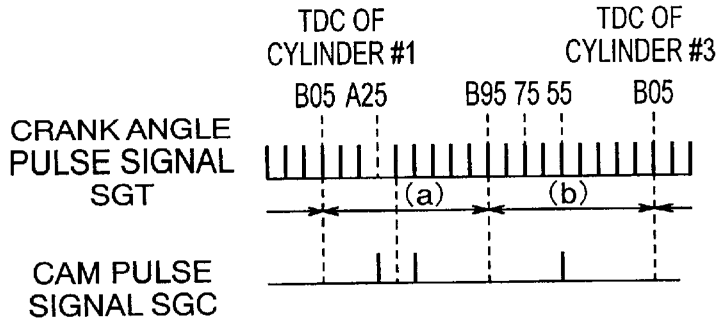
FIG. 4
| CYLINDER | #1 | #3 | #4 | #2 |
|---|---|---|---|---|
| SUBPERIOD (a) | 1 | 2 | 0 | 0 |
| SUBPERIOD (b) | 0 | 1 | 2 | 1 |
FIG. 5
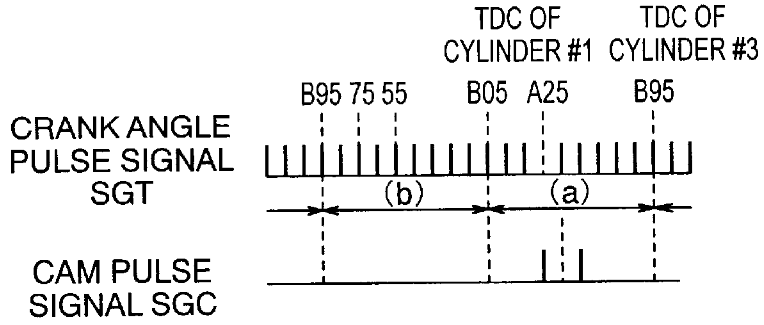
FIG. 6
| CYLINDER | #3 | #4 | #2 | #1 |
|---|---|---|---|---|
| SUBPERIOD (b) | 0 | 1 | 2 | 1 |
| SUBPERIOD (a) | 2 | 0 | 0 | 1 |

FIG. 7
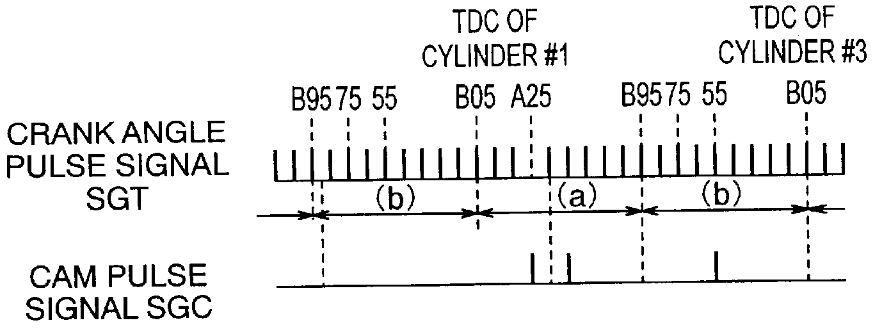
FIG. 8
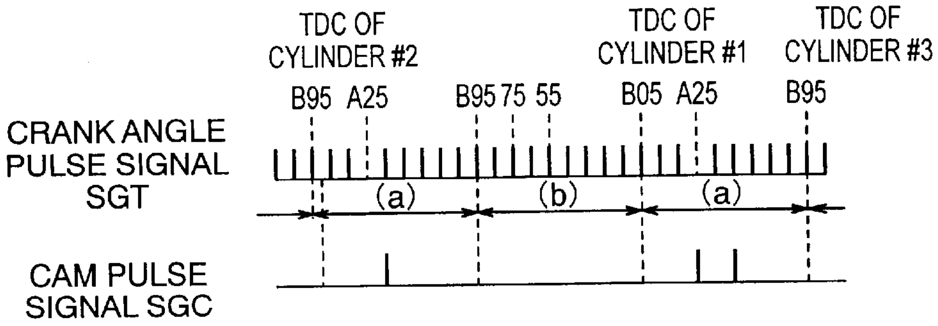
FIG. 9
| CYLINDER | #1 | #3 | #4 | #2 |
|---|---|---|---|---|
| SUBPERIOD (a) | 1 | 2 | 0 | 0 |
| SUBPERIOD (b) | 0 | 1 | 2 | 1 |
| TOTAL | 1 | 3 | 2 | 1 |

FIG. 16
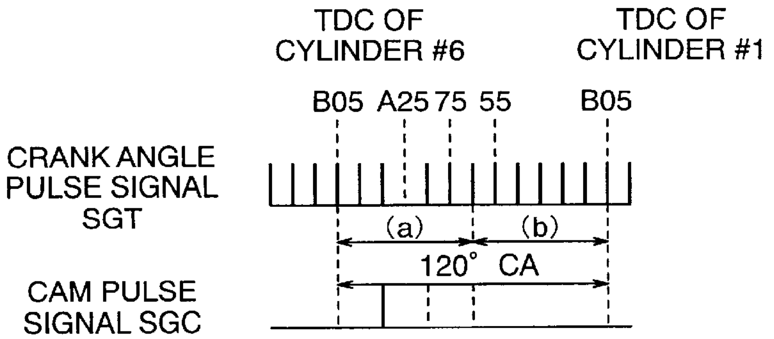
FIG. 17
| | | | | | | |
|---|---|---|---|---|---|---|
| SUBPERIOD (a) | 1 | 2 | 1 | 0 | 1 | 0 |
| SUBPERIOD (b) | 0 | 0 | 2 | 2 | 1 | 1 |
| IDENTIFIED CYLINDER | #1 | #2 | #3 | #4 | #5 | #6 |
FIG. 18
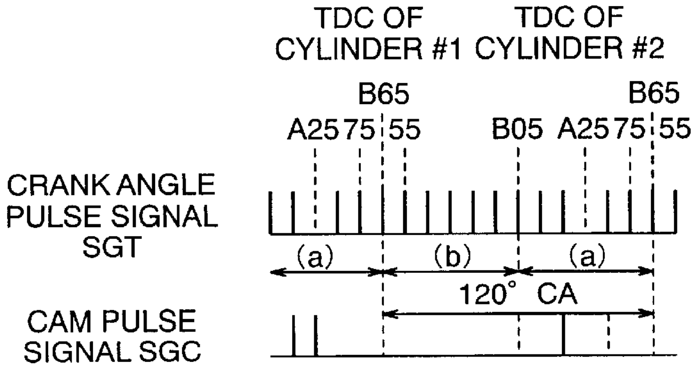
FIG. 19
| | | | | | | |
|---|---|---|---|---|---|---|
| SUBPERIOD (a) | 2 | 0 | 2 | 2 | 1 | 1 |
| SUBPERIOD (b) | 2 | 1 | 0 | 1 | 0 | 1 |
| IDENTIFIED CYLINDER | #2 | #3 | #4 | #5 | #6 | #1 |

FIG. 20
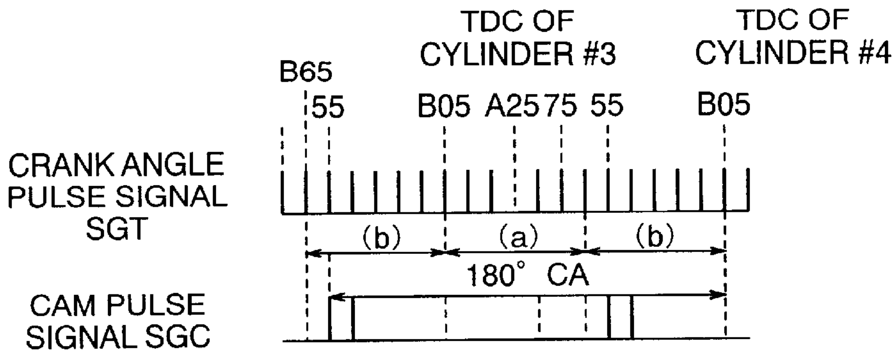
FIG. 21
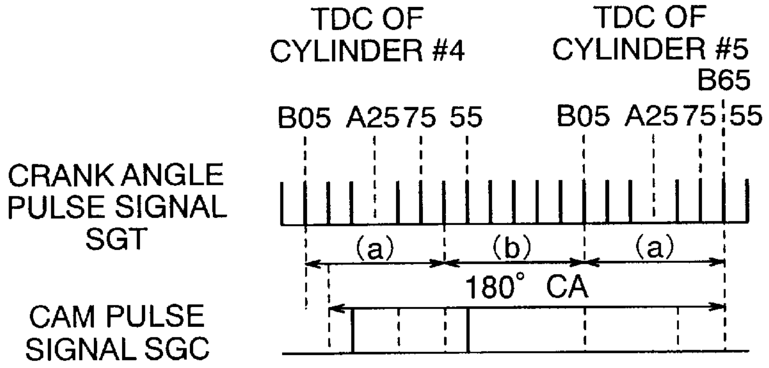
FIG. 22
| | #1 | #2 | #3 | #4 | #5 | #6 |
|---|---|---|---|---|---|---|
| SUBPERIOD (a) | 1 | 2 | 1 | 0 | 1 | 0 |
| SUBPERIOD (b) | 0 | 0 | 2 | 2 | 1 | 1 |
| (a) + (b) | 1 | 2 | 3 | 2 | 2 | 1 |

FIG. 24

| | | | | | | |
|---|---|---|---|---|---|---|
| (a) | 1 | 2 | 1 | 0 | 1 | 0 |
| (b) | 0 | 0 | 2 | 2 | 1 | 1 |
| CYLINDER IDENTIFICATION | CYLINDER #1 | | CYLINDER #3 | | CYLINDER #2 | |
| | B125 | B05 | B125 | B05 | B125 | B05 |

FIG. 25

| | | | | | | |
|---|---|---|---|---|---|---|
| (b) | 1 | 0 | 0 | 2 | 2 | 1 |
| (a) | 1 | 2 | 1 | 0 | 1 | 0 |
| CYLINDER IDENTIFICATION | CYLINDER #1 | | CYLINDER #3 | | CYLINDER #2 | |
| | A55 | B65 | A55 | B65 | A55 | B65 |

CYLINDER IDENTIFYING SYSTEM FOR INTERNAL COMBUSTION ENGINE

BACKGROUND OF THE INVENTION

This application is based on Application No. 2000-317930, filed in Japan on Oct. 18, 2000, the contents of which are hereby incorporated by reference.

The present invention generally relates to a cylinder identifying system for an internal combustion engine mounted on an automobile or a motor vehicle. More particularly, the present invention is concerned with a cylinder identifying system for an internal combustion engine which system is designed for identifying discriminatively individual cylinders of the internal combustion engine within a short time upon starting of operation of the engine to thereby allow a fuel injection control and an ignition control for the engine to be speedily carried out on a cylinder-by-cylinder basis.

DESCRIPTION OF RELATED ART

As the hitherto known or conventional cylinder identifying system of the sort mentioned above, there can be mentioned the one which is disclosed, for example, in Japanese Unexamined Patent Application Publication No. 146992/1994 (JP-A-6-146992). In the cylinder identifying system described in this publication, a crank angle pulse signal generated in synchronism with rotation of a crank shaft of the internal combustion engine and a cam pulse signal generated in synchronism with rotation of a cam shaft which is operatively coupled to the crank shaft and rotated at a speed ratio of ½ relative to that of the crank shaft are employed for detecting the angle of rotation or angular position of the crank shaft on the basis of which engine operation controls such as a fuel injection control, an ignition control, etc. are performed for the individual cylinders of the engine.

For generating the crank angle pulse signal, a crank angle sensor is provided which is constituted by a ring gear (or toothed wheel) mounted in a coaxial relation with the crank shaft and having an outer periphery formed with projections or teeth and an electromagnetic pickup device disposed in opposition to the outer periphery of the ring gear for generating pulses in response to the individual projections or teeth, respectively. The crank angle pulse signal is derived from the output signal of the electromagnetic pickup device and includes sequentially a series of pulse trains, wherein each pulse train corresponds to a predetermined angle of rotation of the crank shaft or a predetermined angular range delimited by a reference position.

On the other hand, the pulse generator for generating the cam pulse signal is so arranged that the numbers of pulses contained in the cam pulse signals, respectively, differ from one another for the crank angle pulse signals SGT generated successively each over a predetermined crank angle range corresponding to given one of the engine cylinders. Thus, on the basis of combination of the numbers of pulses contained in the cam pulse signals generated within a preceding range (during a preceding period, to say in another way) and within a current range (during a current period), it is certainly possible to identify the individual cylinder sets as well as particular or specific position(s) in the crank angle pulse signal.

However, in the conventional cylinder identifying system for the internal combustion engine, the combinations of the pulse numbers generated at the specific positions are limited to three values, i.e., "0", "1" and "2". Accordingly, in the case of a six-cylinder engine, it is impossible to identify discriminatively any given cylinder on the basis of only the combination of the numbers of pulses generated during two periods (or over two ranges), respectively.

Further, since the specific position and the cylinders are determined discriminatively on the basis of the combination of the numbers of pulses generated during the preceding period and the current period, respectively, the cylinder identification is rendered impossible in the case where the end point of the current period does not coincide with the specific position.

By way of example, in the case of the four-cylinder engine, the range of crank angles corresponding or equivalent to one period is set to be 90° CA (i.e., 90 degrees in terms of the crank angle or CA in short). Consequently, the cylinder identification processing can be completed within a period corresponding to rotation of the engine for 180° CA at the shortest although it depends on the crank angle at which the engine was stopped in the preceding operation. However, there will arise such situation that the cylinder identification can not be completed until the engine has rotated over 360° CA at maximum, which of course depends on the crank angle at which the engine was stopped in the preceding operation. In the latter case, starting of the engine operation from the stopped state requires a lot of time, needless to say.

Another cylinder identifying system for the internal combustion engine is disclosed, for example, in Japanese Unexamined Patent Application Publication No. 311146/1999 (JP-A-11-311146). In this known cylinder identifying system, a crank angle pulse signal (POS) including pulse trains each having a duration or a period which corresponds to a predetermined crank angle range (10° CA) and having a reference position which corresponds to a tooth absent or dropout location in an outer peripheral projection or tooth array of a ring gear, an angle reference signal (REF) indicating an angle reference differing from the reference position mentioned above, and a cam pulse signal (CAM).

In this cylinder identifying system known heretofore, the cam pulse signal generating unit is so arranged that the numbers of pulses generated during successive subperiods, respectively, which are defined by dividing a corresponding crank angle period for each engine cylinder differ from each other.

In the system mentioned above, an electronic control unit which may be constituted by a microcomputer or the like is so designed as to respond to detection of the angle reference signal REF to thereby divide a range or period defined between a detected start point (leading edge) and an end point (trailing edge) of the angle reference signal REF into a plurality of subperiods (e.g. two subperiods).

The durations of the subperiods can be measured with the crank angle pulse signal POS. On the other hand, an array of projections or teeth formed on and along the outer periphery of a rotatable plate mounted coaxially with the cam shaft is previously so arranged that the cam pulse signals CAM generated during the subperiods, respectively, differ from each other in respect to the pulse number.

More specifically, the numbers of pulses of the cam pulse signals CAM generated during the subperiods are previously set to two different values (e.g. "1" and "0"), respectively, wherein the cylinder identification can be realized on the basis of combination of the numbers of the cam pulses generated during the subperiods each extending from a given angle reference signal REF to a succeeding angle reference signal REF.

Also in this case, a period extending between the angle reference signals REF is divided into a plurality of subperiods after detection of the angle reference signals REF and then the cylinder identification is carried out on the basis of combination of the numbers of pulses generated during the plural subperiods, respectively. Thus, the cylinder identification can be started only after the generation of the angle reference signals REF.

Such being the circumstances, also in the cylinder identifying system disclosed in Japanese Unexamined Patent Application Publication No. 311146/1999, one period which corresponds to revolution of the engine for 180° CA is required for completing the cylinder identification processing at the shortest although it depends on the crank angle at which the engine was stopped in the preceding operation thereof, similarly to the case of the cylinder identifying system disclosed in Japanese Unexamined Patent Application Publication No. 146992/1994. In the worst case, the cylinder identification can not be completed until the engine has been rotated over 360° CA, which means, needless to say, that a lot of delay time will be involved for starting the engine operation from the stationary state.

Further, since the numbers of the pulses generated during the subperiods, respectively, are set at different values "0" and "1", there may arise such situation in the case of the four-cylinder engine that the numbers of pulses generated in both the preceding and succeeding subperiods are "0" and "0", respectively. In this conjunction, it is noted that similar situation will take place upon occurrence of a fault such as wire breakage. In that case, no cam pulse signal is generated. In other words, distinction from the state in which no cam pulse signal is generated due to a fault is rendered impossible, incurring thus a problem in respect to the fail-safe function.

As can now be appreciated from the foregoing description, in the conventional cylinder identifying system disclosed, for example, in Japanese Unexamined Patent Application Publication No. 146992/1994, the specific or particular position is determined on the basis of the combination of the numbers of pulses of the cam pulse signal generated during predetermined time durations or periods. However, since the number of the combinations of the pulse numbers generated at the specific positions is smaller than the number of the cylinders, it is impossible to identify any given specific cylinder on the basis of only the combination of the numbers of the pulses generated during two discrete periods in the case of a six-cylinder internal combustion engine, giving rise to a problem.

Further, in case the end point of the current period does not coincide with the specific position, it is impossible to perform the cylinder identification on the basis of the combination of the numbers of the generated pulses of the cam pulse signal. As a consequence, the cylinder identification processing can not be completed until the engine has rotated for 360° CA at maximum although it depends on the crank angle at which the engine was stopped in the preceding operation, incurring thus a problem that a remarkable time delay will be involved for starting again the engine operation.

On the other hand, in the case of the cylinder identifying system disclosed in Japanese Unexamined Patent Application Publication No. 311146/1999, the cylinder identification is performed on the basis of combination of the numbers of pulses of the cam pulse signal CAM generated during a plurality of subperiods defined by dividing correspondingly the period of the angle reference signal REF, and thus the cylinder identification processing is started after generation of the angle reference signal REF. Consequently, there also arises the problem that the cylinder identification processing can not be completed until the engine has rotated 360° CA at maximum although it depends on the crank angle at which the engine was stopped in the preceding operation, as a result of which a lot of time is taken for starting again the engine operation.

Furthermore, since the numbers of pulses generated during the subperiods, respectively, are set to two different values, such problem is incurred that when the number of pulses generated in both the subperiods of the cylinder identification period are "0" and "0", distinction from the state where no cam pulse signal is outputted due to occurrence of a fault such as wire breakage is rendered impossible, giving rise to a problem in respect to the failsafe performance.

SUMMARY OF THE INVENTION

In the light of the state of the art described above, it is an object of the present invention to provide a cylinder identifying system for an internal combustion engine which system is capable of performing the cylinder identification within a smaller angular range of engine rotation and hence within a shortened time to thereby enable the fuel injection control and the ignition control for each engine cylinder to be speedily carried out upon engine starting operation.

In view of the above and other objects which will become apparent as the description proceeds, there is provided according to a general aspect of the present invention a cylinder identifying system for an internal combustion engine, which system includes a crank angle signal detecting means for generating a crank angle pulse signal composed of pulse trains each containing a reference position in synchronism with rotation of a crank shaft of the internal combustion engine, a cam shaft rotating at a speed corresponding to one half of that of the crank shaft, a cam signal detecting means for generating a cam pulse signal including specific pulses identifying individual cylinders, respectively, of the internal combustion engine in synchronism with rotation of the cam shaft, and a cylinder identifying means for identifying the individual cylinders, respectively, of the internal combustion engine on the basis of the crank angle pulse signal and the cam pulse signal. In the cylinder identifying system mentioned above, the cylinder identifying means is comprised of a pulse signal number storage means for dividing an ignition control period for each of the individual cylinders into a plurality of subperiods for thereby counting for storage signal numbers of the specific pulses generated during the plural subperiods, respectively, and a subperiod discriminating means for determining discriminatively a sequential order of the plural subperiods on the basis of combinations of the signal numbers of the specific pulses generated during the plural subperiods, respectively. The combinations of the signal numbers of the specific pulses generated during the plural subperiods, respectively, differ from one to another correspondingly to the plural subperiods in dependence on start points of the plural subperiods, respectively. The cylinder identifying means is so designed as to identify the individual cylinders on the basis of results of the discriminative determination of the subperiods performed by the subperiod discriminating means independently of the start points of the plural subperiods.

By virtue of the arrangement described above, there is provided for an internal combustion engine the cylinder identifying system capable of performing the cylinder identification within a smaller angular range of engine rotation and hence within a shortened time for thereby allowing the fuel injection control and the ignition control for each engine cylinder to be speedily carried out upon engine starting operation.

In a preferred mode for carrying out the invention, the pulse signal number storage means may be so designed as to count for storage the signal number of the cam pulse signal and the number of pulses of the crank angle pulse signal, respectively, from the start of operation of the internal combustion engine. The cylinder identifying means may be constituted by a pulse signal sequential order storage means for storing therein temporal relations between the pulse trains of the crank angle pulse signal and the specific pulses of the cam pulse signal, and a reference position detecting means for detecting the reference position from the crank angle pulse signal, wherein when it is decided that the crank angle pulse signal has been detected since a start point of a preceding, subperiod at the latest on the basis of the number of pulses of the crank angle pulse signal which have been stored up to the reference position, the cylinder identifying means identifies the individual cylinders on the basis of the signal number of the cam pulse signal(s) generated during the preceding subperiod.

In another preferred mode for carrying out the invention, the cylinder identifying means may be so arranged that when it is decided after detection of the reference position that the crank angle pulse signal has been detected since the start point of the current subperiod at the latest on the basis of the pulse number of the crank angle pulse signal stored up to a time point at which an end point of the current subperiod including the reference position is detected, the cylinder identifying means identifies the individual cylinders on the basis of the signal number of the cam pulse signal(s) generated during the current subperiod.

In yet another mode for carrying out the invention, the cylinder identifying means may preferably be so implemented that when it is decided on the basis of the pulse number of the crank angle pulse signal stored up to a subperiod end point of the plural subperiods that the crank angle pulse signal has been detected since the start point of the preceding subperiod at the latest, the cylinder identifying means then identifies the individual cylinders on the basis of combination of the signal number of the cam pulse signal(s) generated during the preceding subperiod and the signal number of the cam pulse signal(s) generated during the current subperiod.

Owing to the arrangements of the cylinder identifying system described above, the fuel injection control and the ignition control can be speedily carried out for the individual engine cylinders upon engine starting operation.

In still another mode for carrying out the present invention, such arrangement should preferably by adopted that the combinations of the signal numbers of the cam pulse signals generated during the plural subperiods includes no combination of only “0s” which indicates absence of output.

With the arrangement described above, there can be realized the cylinder identifying system which can ensure a fail-safe function described later on.

In a further mode for carrying out the present invention which is applied to a four-cylinder internal combustion engine in which the ignition control period for each of the cylinders is so set as to correspond to a crank angle of 180°, the plural subperiods should preferably be comprised of a first subperiod and a second subperiod, wherein numbers of the specific pulses contained in the cam pulse signal generated during the first subperiod and the second subperiod, respectively, should be “1” and “0”, “2” and “1”, “0” and “2” and “0” and “1”, respectively, in the order in which the cylinders are to be controlled.

In a yet further mode for carrying out the present invention applied to a six-cylinder internal combustion engine in which the ignition control period for each of the cylinders is so set as to correspond to a crank angle of 120°, the plural subperiods should preferably be comprised of a first subperiod and a second subperiod, wherein numbers of the specific pulses contained in the cam pulse signal generated during the first subperiod and the second subperiod, respectively, should be “1” and “0”, “2” and “0”, “1” and “2”, “0” and “2”, “1” and “1” and “0” and “1”, respectively, in the order in which the cylinders are controlled.

In a still further mode for carrying out the present invention applied to a three-cylinder internal combustion engine in which the ignition control period for each of the cylinders is so set as to correspond to a crank angle of 240°, the plural subperiods should preferably include a first subperiod and a second subperiod, wherein numbers of the specific pulses contained in the cam pulse signal generated during the first subperiod and the second subperiod, respectively, should be “1” and “0”, “2” and “0”, “1” and “2”, “0” and “2”, “1” and “1” and “0” and “1”, respectively, in the order in which the cylinders are controlled.

Owing to the features described above, there can be realized the cylinder identifying system which can ensure the fail-safe function while enabling the fuel injection control and the ignition control for each engine cylinder to be speedily carried out upon engine starting operation.

In a further mode for carrying out the invention, the crank angle pulse signal should preferably be comprised of pulse trains each of a period corresponding to a crank angle of 10°, wherein the reference position included in the crank angle pulse signal should be set at a crank angle of 35° from the top dead center on a cylinder-by-cylinder basis.

With the arrangement described above, the fuel injection control and the ignition control can speedily be carried out for each of the engine cylinders while ensuring enhanced controllability and high control accuracy.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 3 is a timing chart for illustrating cylinder identifying operation performed in the cylinder identifying system according to the first embodiment of the present invention;

FIG. 4 is a view for illustrating a cylinder identification table based on subperiods (a) and (b) which is referenced in conjunction with the signal detection pattern illustrated in FIG. 3;

FIG. 5 is a timing chart for illustrating a second example of the cylinder identifying operation carried out in the cylinder identifying system according to the first embodiment of the present invention;

FIG. 6 is a view showing a cylinder identification table based on subperiods (b) and (a) to be referenced in conjunction with the signal detection pattern illustrated in FIG. 5;

FIG. 7 is a timing chart for illustrating a third example of the cylinder identifying operation carried out in the cylinder identifying system according to the first embodiment of the present invention;

FIG. 8 is a timing chart for illustrating a fourth example of the cylinder identifying operation performed in the cylinder identifying system according to the first embodiment of the present invention;

FIG. 9 is a view showing a cylinder identification table based on a TDC period to be referenced during an ordinary operation in the cylinder identifying system according to the first embodiment of the present invention;

FIG. 16 is a timing chart for illustrating, by way of example, a cylinder identifying operation carried out by the cylinder identifying system according to the second embodiment of the present invention;

FIG. 17 is a view showing a cylinder identification table based on subperiods (a) and (b) to be referenced in conjunction with a signal detection pattern illustrated in FIG. 16;

FIG. 18 is a timing chart for illustrating a second example of the cylinder identifying operation carried out by the cylinder identifying system according to the second embodiment of the present invention;

FIG. 19 is a view showing a cylinder identification table based on subperiods (b) and (a) to be referenced in conjunction with a signal detection pattern illustrated in FIG. 18;

FIG. 20 is a timing chart for illustrating a third example of the cylinder identifying operation carried out by the cylinder identifying system according to the second embodiment of the present invention;

FIG. 21 is a timing chart for illustrating a fourth example of the cylinder identifying operation performed by the cylinder identifying system according to the second embodiment of the invention;

FIG. 22 is a view showing a cylinder identification table based on a TDC period for reference during an ordinary operation in the cylinder identifying system according to the second embodiment of the present invention;

FIG. 24 is a view showing a cylinder identification table based on subperiods (a) and (b) as employed in the cylinder identifying system according to the third embodiment of the present invention; and FIG. 25 is a view showing a cylinder identification table based on subperiods (b) and (a) as employed in the cylinder identifying system according to the third embodiment of the present invention.

DESCRIPTION OF THE PREFERRED EMBODIMENTS

Figure 1:
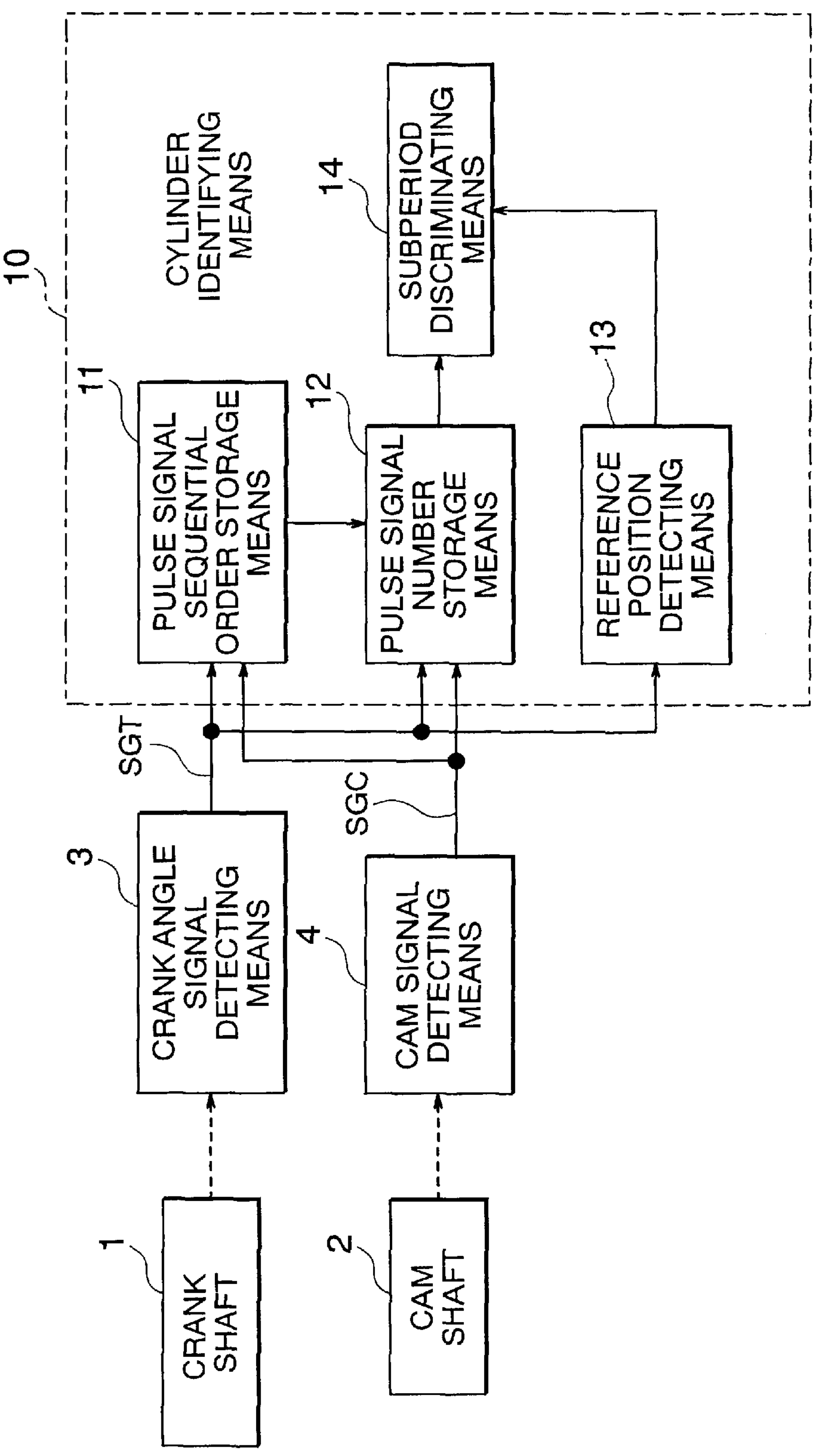
FIG. 1 is a functional block diagram showing generally and schematically a cylinder identifying system for an internal combustion engine according to a first embodiment of the present invention.

The present invention will be described in detail in conjunction with what is presently considered as preferred or typical embodiments thereof by reference to the drawings. In the following description, like reference characters designate like or corresponding parts throughout the several views.

Embodiment 1

FIG. 1 is a functional block diagram showing generally and schematically a cylinder identifying system for an internal combustion engine according to a first embodiment of the present invention. Referring to the figure, an internal combustion engine (also referred to simply as the engine) includes a crank shaft 1 and a cam shaft 2 which rotates at a speed corresponding to one half of that of the crank shaft 1.

A crank angle signal detecting means 3 is provided in association with the crank shaft 1 so as to rotate in synchronism with the crank shaft 1 for thereby generating a crank angle pulse signal SGT in the form of pulse train each containing a pulse indicative of a reference position. On the other hand, provided in association with the cam shaft 2 is a cam signal detecting means 4 which rotates synchronously with the cam shaft 2 for generating a cam pulse signal SGC including particular or specific pulses (signals) for identifying individual cylinders, respectively, of the engine.

A cylinder identifying means 10 which may be constituted by an electronic control unit is provided for identifying the individual cylinders and determining discriminatively the reference position for each of the and the cam pulse signal SGC. To this end, the cylinder identifying means 10 includes a pulse signal sequential order storage means 11 and a pulse signal number storage means 12 designed for storing the crank angle pulse signal SGT and the cam pulse signal SGC, a reference position detecting means 13 for fetching the crank angle pulse signal SGT, and an subperiod discriminating means 14 for fetching output signals of the pulse signal number storage means 12 and the reference position detecting means 13, respectively.

The pulse signal sequential order storage means 11 is designed to store therein the temporal relation between the pulse trains each having a duration of 10° in terms of the crank angle (hereinafter referred to as the CA in short) which are contained in the crank angle pulse signal SGT and the specific pulses for the cylinder identification contained in the cam pulse signal SGC.

On the other hand, the pulse signal number storage means 12 is comprised of a crank angle signal storage means for storing the number of the pulses of the crank angle pulse signal SGT as detected since the start of the engine operation and a cam signal storage means for storing the number of signal pulses of the cam pulse signal SGC generated since the start of the engine operation and serves for counting for storage the number of the pulses of the crank angle pulse signal SGT and the signal pulses of the cam pulse signal SGC, respectively, from the time point at which the engine operation is started.

Further, the pulse signal number storage means 12 is designed to divide the ignition control period for each of the individual cylinders into a plurality of subperiods for thereby counting for storage the signal number of the specific pulses generated over the plurality of subperiods. In this conjunction, it is presumed, by way of example, that the ignition control period is divided into two subperiods (a) and (b) only for the convenience of description, as will hereinafter be made clear.

The reference position detecting means 13 is designed to detect the reference position on the basis of the crank angle pulse signal SGT, while the subperiod discriminating means 14 is designed to decide discriminatively the sequential order of the plural subperiods, i.e., whether the subperiods are in the sequential order of the subperiod (a) and then the subperiod (b) or in the order of the subperiod (b) and then the subperiod (a), on the basis of combination of the signal numbers of the specific pulses generated during the plural subperiods, respectively.

Figure 2:
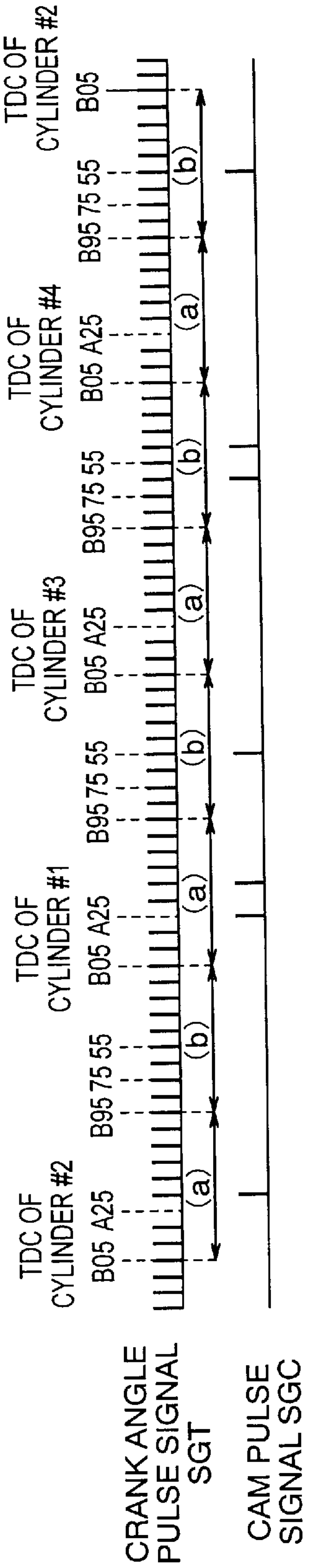
FIG. 2 is a timing chart showing signal patterns of a crank angle pulse signal and a cam pulse signal, respectively, in an internal combustion engine including four cylinders according to the first embodiment of the present invention.

FIG. 2 is a timing chart showing patterns of the crank angle pulse signal SGT and the cam pulse signal SGC, respectively, generated in the internal combustion engine according to the instant embodiment of the present invention on the presumption that the internal combustion engine concerned includes four cylinders, by way of example.

Referring to FIG. 2, the crank angle pulse signal SGT includes a tooth dropout position (pulse absent position) A25° CA (i.e., position succeeding to the top dead center (TDC) by 25° in terms of the crank angle, hereinafter denoted simply by "position A25") for each of the engine cylinders #1 to #4. Parenthetically, in FIG. 2, the crank angle positions are shown over a range extending from a position B95° CA (i.e., position preceding to the top dead center by 95° in terms of the crank angle or CA, hereinafter denoted simply by "position B95") approximately to the position A25 around the center of approximately B05° CA (i.e., position preceding to the top dead center by 5° in terms of CA, hereinafter denoted simply by "position B05") for each of the engine cylinders.

In more concrete, the crank angle pulse signal SGT is composed of pulse trains containing pulses generated every 10° CA, wherein the tooth dropout position A25 corresponds to the position of a ring gear where one tooth is dropped or absent. Consequently, the reference position detected actually in correspondence to the tooth dropout is the position succeeding to the top dead center (TDC) by 35° in terms of crank angle (hereinafter referred to as "position A35").

Each of the TDC period (top dead center periods) which extends over the angular range of 180° CA of the crank angle pulse signal SGT is divided into plural subperiods (two subperiods in the case of the illustrated example), i.e., the subperiod (a) containing the reference position A35 (corresponding to the tooth dropout position) and the subperiod (b) which does not include the reference position A35.

On the other hand, the cam pulse signal SGC includes different numbers of the specific signal pulses (combinations of "0", "1" and "2") in correspondence to the individual cylinders. More specifically, when the ignition control period for each of the cylinders is divided into a plurality of subperiods (two subperiods), the cam pulse signal SGC is so set that combinations of the numbers of the specific signal pulses generated in each of the subperiod (a) and the subperiod (b) differ in correspondence to the plural subperiods in dependence on the start points thereof, respectively. Incidentally, when the storage of the specific pulses is started from an intermediate time point of the subperiod, the data acquired during a period extending from the storage start point to the start point of the first succeeding subperiod is not used for the cylinder identification.

In this manner, the cylinder identifying means 10 is so designed as to be capable of identifying or discerning discriminatively the individual cylinders on the basis of the result of determination of the subperiod discriminating means 14 independently of the positional relationships between the storage starting point of the pulse signal number storage means 12 and the plural subperiods (a) and (b).

More specifically, the cylinder identifying means 10 identifies discriminatively the cylinders on the basis of the number of pulses of the crank angle pulse signal SGT which have been stored until the reference position A35 located adjacent to the tooth dropout position A25 is detected.

In other words, when it is decided that the crank angle pulse signal SGT has been detected since the start point of the preceding one of the plural subperiods at, the latest, the cylinder identifying means 10 identifies the individual cylinders on the basis of the number of pulses of the cam pulse signal SGC generated during the preceding subperiod.

On the other hand, when it is decided that the crank angle pulse signal SGT has been detected from the start point of the current subperiod at the latest on the basis of the number of pulses of the crank angle pulse signal SGT stored up to the time point at which the end point of the current subperiod including the reference position A35 among the plural subperiods is detected, the cylinder identifying means 10 identifies the individual cylinders on the basis of the signal number of the cam pulse signal SGC generated during the current subperiod.

Furthermore, when it is decided on the basis of the number of pulses of the crank angle pulse signal SGT stored till the detection of the end point of the plural subperiods that the crank angle pulse signal SGT has been detected since the start of the preceding subperiod at the latest, the cylinder identifying means 10 identifies the individual cylinders on the basis of the combination of the signal number of the cam pulse signal SGC generated during the preceding subperiods and the signal number of the cam pulse signal SGC generated during the current subperiod.

At this juncture, it should be mentioned that the combination of the signal numbers of the cam pulse signal SGC generated during the plural subperiods (a) and (b) contains no combination of "0" and "0" indicating the absence of output. In other words, at least one of the signal numbers generated during the subperiods (a) and (b) is "1" or "2".

It should also be added that the cam pulse signal SGC is so generated that a predetermined number of pulse signals make appearance during subperiod in consideration of the phase difference between the crank angle pulse signal SGT and the cam pulse signal SGC.

Now, referring to FIG. 2, it is presumed, by way of example, that the top dead center (TDC) period of each cylinder is so set as to extend from a position B05 close to the top dead center (TDC) of a given cylinder to a position B05 close to the top dead center (TDC) of a succeeding cylinder. Incidentally, the position B05 will also be referred to as the top dead center only for convenience of the description, because the position B05 is located very closely to the top dead center.

In the subperiods (a) and (b) defined by dividing by two the TDC period (also referred to as the ignition control period) extending from the top dead center (B05) of the cylinder #2 to the top dead center (B05) of the succeeding cylinder #1, the pulse numbers of the cam pulse signal SGC generated during these subperiods (a) and (b) are "1" and "0", respectively.

Similarly, the number of pulses generated during the subperiods (a) and (b) defined, respectively, by dividing by two the TDC period extending from the top dead center (B05) of the cylinder #1 to that (B05) of the cylinder #3 are "2" and "1", respectively, while the number of the pulses generated during the subperiods (a) and (b) defined, respectively, by dividing by two the TDC period extending from the top dead center (B05) of the cylinder #3 to that (B05) of the cylinder #4 are "0" and "2", respectively, and the number of pulses generated during the subperiods (a) and (b) defined, respectively, by dividing by two the TDC period extending from the top dead center (B05) of the cylinder #4 to that (B05) of the cylinder #2 are "0" and "1", respectively.

In the following, description will be made of the cylinder identifying operation carried out by the cylinder identifying system according to the instant embodiment of the invention shown in FIG. 1 by referring to FIGS. 2 to 8. In the first place, description will be directed to the typical cylinder identifying operation by referring to FIGS. 2 to 4.

FIG. 3 is a timing chart for illustrating operation of the cylinder identifying means 10 incorporated in the cylinder identifying system shown in FIG. 1. More specifically, there is illustrated a pulse signal detection pattern in the case where detection of the crank angle pulse signal SGT and the cam pulse signal SGC is started from a position immediately before the position B05 of the cylinder #1 (the start point of the subperiods (a)) upon starting of the engine operation.

FIG. 4 is a view for illustrating a cylinder identification table which is referenced in conjunction with the pulse signal detection pattern illustrated in FIG. 3. This cylinder identification table is incorporated or stored in the subperiod discriminating means 14.

Referring to FIG. 3, when the signal detection is started from a position (B05) immediately before the ton dead center of the cylinder #1 upon starting of the engine operation, the numbers of pulses of the crank angle pulse signal SGT and the cam pulse signal SGC, respectively, which have been detected since the time point corresponding to the position B05, are firstly counted to be stored in the pulse signal number storage means 12.

Subsequently, the reference position detecting means 13 incorporated in the cylinder identifying means 10 arithmetically determines the preceding period Tsgt(n−1) and the current period Tsgt(n) of the crank angle pulse signal SGT, respectively, whereon the ratio of the period Tsgt(n) to the period Tsgt(n−1) is arithmetically determined as a period ratio TR(n) in advance in accordance with the following expression:

$$TR(n)=Tsgt(n)/Tsgt(n-1) \quad (1)$$

In succession, the reference position detecting means 13 makes decision as to whether or not the period ratio TR(n) of the crank angle pulse signal SGT is equal to or greater than a predetermined value Kr. When it is decided that TR(n)≧Kr, the reference position A35 is detected.

In this conjunction, the predetermined value Kr mentioned above is so selected in consideration of variation of rotation of the engine that the reference position A35 (corresponding to the dropout tooth position) can be determined when the period ratio TR(n) is about twice as large as the ordinary value.

At the time point when the reference position A35 is detected, the cylinder identifying means 10 is not in the position to identify the cylinder yet. However, it is possible to discriminatively determine that the current subperiod (i.e., the subperiod currently concerned) is the subperiod (a).

Furthermore, when it is found by referencing the data stored in the pulse signal number storage means 12 that the pulse number of the crank angle pulse signal SGT detected during the period extending from the start of detection of the signal SGT to the detection of the reference position A35 is equal to or greater than "4", it can then be decided that the detection has been started from the start point B05 of the subperiod (a) at the latest, which means that the number of pulses of the crank angle pulse signal SGT at the time point corresponding to the position B05 can be confirmed.

Now, the subperiod discriminating means 14 incorporated in the cylinder identifying means 10 makes reference to the data stored in the pulse signal number storage means 12 for determining the end position or point B95 of the subperiod (a). In this case, the detected pulse number of the crank angle pulse signal SGT indicates the number of pulses of the crank angle pulse signal SGT detected during the period extending from the start of the detection to the current time point.

When the number of pulses of the crank angle pulse signal SGT as detected since the detection time point corresponding to the position B05 is "9", this means that the current time point corresponds to the end point or position B95 of the subperiod (a). Accordingly, the number of pulses of the cam pulse signal SGC as detected up to this time point (i.e., during the subperiod (a)) is checked. In the case of the example illustrated in FIG. 3, the number of pulses of the cam pulse signal SGC generated during the subperiod (a) is "2".

Subsequently, the subperiod discriminating means 14 incorporated in the cylinder identifying means 10 refers to the data stored in the pulse signal number storage means 12 for detecting the end point or position B05 of the subperiod (b) which succeeds to the subperiod (a) mentioned above.

On the other hand, when the number of pulses of the crank angle pulse signal SGT detected since the start point B95 of the subperiod (b) up to the current time point is "9", this means that the current time point corresponds to the end point or position B05 of the subperiod (b). Accordingly, the number of pulses of the cam pulse signal SGC as detected up to this time point (i.e., during the subperiod (b)) is checked. In the case of the example illustrated in FIG. 3, the number of pulses of the cam pulse signal SGC generated during the subperiod (b) is "1".

Thus, the numbers of pulses of the cam pulse signal SGC generated during the subperiods (a) and (b) are "2" and "1", respectively. Accordingly, by referencing the cylinder identification table shown in FIG. 4 by the cylinder identifying means 10, it can be found that the current crank angle position detected latest is the top dead center (B05) of the cylinder #3.

In the case where detection of the crank angle pulse signal SGT is started from a time point immediately preceding to the start point (B05) of the subperiod (a) by starting the engine operation at that time point, the cylinder identification processing will be completed within a time period corresponding to the crank angle range of about 180° CA, as can be seen from FIG. 3.

Furthermore, as can be seen in FIGS. 2 to 4, when the number of pulses of the cam pulse signal SGC generated during the subperiod (a) is "1" or "2", it can straightforwardly be decided that the current crank angle position coincides with the position B95 of the cylinder #1 or the cylinder #3 on the basis of only the number of pulses generated during the subperiod (a) already at the detection time point corresponding to the position B95 without need for referencing the number of pulses Generated during the succeeding subperiod (b).

In this case, the range of the crank angle corresponding to the time lapse from the start of detection of the crank angle pulse signal SGT upon starting of the engine to the cylinder identification is approximately 90° CA.

Next, referring to FIGS. 5 and 6 together with FIG. 2, description will be directed to another typical or exemplary operations. FIG. 5 is a timing chart for illustrating operation when the signal detection is started from a time point immediately preceding to the position B95 of the cylinder #1 (i.e., at the start point of the subperiod (b)) upon starting of the engine operation, and FIG. 6 is a view for illustrating a cylinder identification table which is referenced in conjunction with the pulse signal detection pattern illustrated in FIG. 5.

Referring to FIG. 5, when the signal detection is started from a position immediately preceding to the position B95 of the cylinder #1, the pulse numbers of the crank angle pulse signal SGT and the cam pulse signal SGC, respectively, which have been detected from the time point corresponding to the position B95 are firstly counted to be stored in the pulse signal number storage means 12.

In that case, the reference position A35 is not detected during the subperiod (b) whose start point is the position B95. Accordingly, even at the time point when the start point B05 of the succeeding subperiod (a) has been reached, it is impossible to determine definitely the absolute value of the crank angle position.

Subsequently, at the time point when the reference position A35 is detected, the subperiod discriminating means 14 determines the absolute value of the crank angle A35 for thereby discriminating definitely the subperiods of the individual cylinders on the basis of the number of pulses contained in the crank angle pulse signal SGT detected since the time point when the engine was started.

More specifically, when the number of detected pulses of the crank angle pulse signal SGT is "13" or more, it can be decided that the pulse detection has been started from a time point corresponding to or preceding to the start point B95 of the subperiod (b), and thus, the start point B95 can discriminatively be determined.

In this manner, when it can be verified that the crank angle pulse signal SGT has been detected over the time span from the start point B95 of the subperiod (b) up to the end point B05 thereof, i.e., when the crank angle pulse signal SGT has been detected throughout the subperiod (b) wholly, the cylinder identifying means 10 can check the number of pulses contained in the cam pulse signal SGC detected during the subperiod (b)). Incidentally, in the case of the example illustrated in FIG. 5, the number of pulses generated during the subperiod (b) is "0".

In succession, the subperiod discriminating means 14 incorporated in the cylinder identifying means 10 detects the position B95 of the cylinder #3 (the end point of the subperiod (a)) and confirms or detects that the number of pulses contained in the cam pulse signal SGC generated during the subperiod (a) is "2".

As is apparent from the above, the numbers of pulses generated during the individual subperiods (b) and (a) are "0" and "2", respectively. Accordingly, by referencing the cylinder identification table shown in FIG. 6, the cylinder identifying means 10 can determine that the current crank angle position is the position B95 of the cylinder #3 (the end point of the subperiod (a)).

As is illustrated in FIG. 5, in the case where detection of the crank angle pulse signal SGT is started with from a time point immediately preceding to the start point B95 of the subperiod (b) by starting the engine operation from that time point, the cylinder identification can be completed within a time span corresponding to the crank angle range of about 180° CA.

Furthermore, as can be seen in FIGS. 2 to 6, when the number of pulses of the cam pulse signal SGC generated during the subperiod (b) is "2", it can straightforwardly be decided that the current crank angle position is the position B05 of the cylinder #4 on the basis of only the number of pulses generated during the subperiod (b) already at the time point corresponding to the position B05 without need for referencing the data concerning the number of pulses generated during the succeeding subperiod (a).

In this case, the range of the crank angle corresponding to the time lapse from the start of the pulse signal detection validated upon starting of the engine operation to the cylinder identification is about 130° CA.

Next, referring to FIG. 7, description will be directed to the operation in the case where a maximum range of the crank angle is involved for the cylinder identification. FIG. 7 is a timing chart for illustrating operation when the signal detection is started from a time point or position immediately succeeding to the position B95 of the cylinder #1 (i.e., the start point of the subperiod (b)) upon starting of engine operation.

In this case, the signal detection start position lies in the vicinity of the position B85° CA immediately succeeding to the position B95. Accordingly, the detected number of pulses of the crank angle pulse signal SGT at the time point when the reference position A35 (corresponding to the dropout tooth position) was detected is "12".

Thus, the reference position detecting means 13 can discriminatively determine the reference position A35 in terms of the absolute angle value.

However, since detection of the crank angle pulse signal SGT is not started from the start point B95 of the subperiod (b), the detected pulse number "12", of the crank angle pulse signal SGT is not sufficient for the subperiod discriminating means 14 to get information concerning the number of pulses of the cam pulse signal SGC generated during the subperiod (b) firstly subjected to the pulse detection.

Subsequently, at the time point when the end point B95 of the subperiod (a) is detected on the basis of the number of pulses "6" of the crank angle pulse signal SGT detected since the time point corresponding to the reference position A35, the subperiod discriminating means 14 confirms that the number of pulses of the cam pulse signal SGC generated during the subperiod (a) is "2".

In succession, at the time point when the end point of the subperiod (b) (i.e., position B05 of the cylinder #3) is detected on the basis of the number of pulses "9", of the crank angle pulse signal SGT detected since the time point corresponding to the position B95 of the cylinder #3, the subperiod discriminating means 14 confirms that the number of pulses of the cam pulse signal SGC generated during the subperiod (b) is "1".

As is apparent from the above, the numbers of pulses Generated during the individual subperiods (a) and (b) are "2" and "1", respectively. Accordingly, by referencing the cylinder identification table shown in FIG. 4, the cylinder identifying means 10 can determine that the current crank angle position coincides with the position B05 of the cylinder #3.

As can be seen in FIG. 7, in the case where detection of the pulse signal is started from a time point immediately succeeding to the start of the subperiod (b) validated upon starting of the engine operation, the cylinder identification will be completed within a time period corresponding to the crank angle range of about 270° CA.

Also in this case, when the number of pulses of the cam pulse signal SGC generated during the subperiod (a) is "2" or "1", the cylinder identification can straightforwardly be performed only on the basis of the number of the pulses generated during the subperiod (a). Namely, it can be determined that the time required for completing the cylinder identification processing is equivalent to the crank angle of about 180° CA.

Next, referring to FIG. 8, description will be directed to another example of operation in which a maximum range of the crank angle is required for the cylinder identification. FIG. 8 is a timing chart for illustrating operation when the signal detection is started from a time point or position immediately succeeding to the position B05 of the cylinder #2 (i.e., the start point of the subperiod (a)) upon starting of the engine operation.

Referring to FIG. 8, the position for starting the detection of the crank angle pulse signal SGT is the position A05° CA immediately succeeding to the position B05 of the cylinder #2.

Thus, at the time point when the absolute value A35 of the crank angle (corresponding to the dropout tooth position) is detected, it can be determined that the crank angle pulse signal SGT has not been detected since the start point (B05) of the subperiod (a) because the number of pulses of the crank angle pulse signal SGT detected since the start of engine operation is "3".

Accordingly, at the time point when the position B95 of the cylinder #1 (end point of the subperiod (a)) is detected, the number of pulses of the cam pulse signal SGC generated during the subperiod (a) is not clear. Thus, the subperiod discriminating means 14 is not in the position to discriminatively determine the number of pulses generated.

In succession, at the time point when the position B05 of the cylinder #1 (i.e., the end point of the subperiod (b)) is detected on the basis of the number of pulses "9" of the crank angle pulse signal SGT detected since the time point corresponding to the position B95 of the cylinder #1, the subperiod discriminating means 14 can verify that the number of pulses of the cam pulse signal SGC generated during the subperiod (b) is "0".

Next, the reference position A35 of the cylinder #1 is detected and then the position B95 of the succeeding cylinder #3 (i.e., the end point of the subperiod (a)) is detected on the basis of the number of pulses "6" of the crank angle pulse signal SGT detected since the time point corresponding to the position A35 of the cylinder #1. Thus, the subperiod discriminating means 14 can confirm that the number of pulses of the cam pulse signal SGC generated during the subperiod (a) is "2".

As is apparent from the above, the numbers of pulses generated during the subperiods (b) and (a) are "0" and "2", respectively. Accordingly, by referencing the cylinder identification table shown in FIG. 6, the cylinder identifying means 10 determines that the current crank angle position coincides with the position B95 of the cylinder #3.

Referring to FIG. 8, in the case where detection of the pulse signal is started from a time point immediately succeeding to the start point of the subperiod (a) upon starting of the engine operation, the cylinder identification will be completed within a time span corresponding to the crank angle range of about 270° CA.

Further, when the number of pulses of the cam pulse signal SGC generated during the subperiod (b) checked firstly is "2", as described above, the cylinder identification processing is immediately terminated. Thus, the time required for completing the cylinder identification processing is equivalent to the crank angle of about 180° CA.

As is apparent from the foregoing, in any one of the cases described by reference to FIG. 3, FIG. 5, FIG. 7 and FIG. 8, respectively, the cylinder identifying operation or processing in the engine operation starting state can be completed during a shorter period (i.e., within a smaller range of the crank angle) when compared with the conventional cylinder identifying system.

By the way, in the ordinary operation which succeeds to the cylinder identification, the cylinder identification processing can equally be carried out continuously on the basis of the combinations of the numbers of pulses of the cam pulse signal SGC generated during the current subperiod and the preceding subperiod, respectively, by reference to the table shown in FIG. 4 or FIG. 6 at the end points of the subperiods (a) and (b), respectively.

In this conjunction, it should further be mentioned that in order to simplify and speed up the cylinder identification processing in the ordinary operation, the cylinder identification procedure may be continued on the basis of the number of pulses of the cam pulse signal SGC generated during both the subperiods (a) and (b) (i.e., during the TDC period intervening between the positions B05 of the individual cylinders without resorting to the division of the TDC period into the subperiods (a) and (b). FIG. 9 is a view showing a cylinder identification table prepared as based on the number of pulses of the cam pulse signal SGC generated during the TDC period on a cylinder-by-cylinder basis. In this case, the cylinder identifying means 10 is so designed as to check the sum of the numbers of pulses generated during the subperiods (a) and (b) to thereby identify the individual cylinders on the basis of the combinations of the numbers of the pulses generated in the preceding TDC period and the current TDC period by making reference to the cylinder identification table shown in FIG. 9.

Next, referring to flow charts shown in FIGS. 10 to 14 together with FIGS. 2 to 9, the processing operations carried out by the cylinder identifying means 10 of the cylinder identifying system according to the first embodiment of the present invention shown in FIG. 1 will be elucidated in more concrete.

Figure 10:
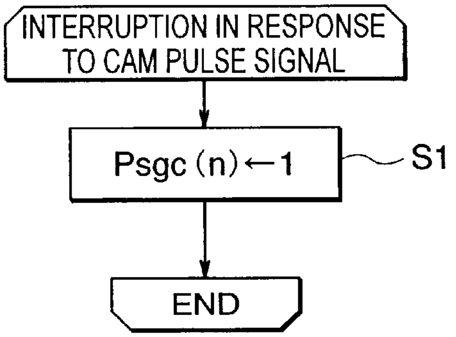
FIG. 10 is a flow chart for illustrating an interrupt processing routine executed by a cylinder identifying means in response to a cam pulse signal in the cylinder identifying system according to the first embodiment of the present invention.

FIGS. 10 to 14 show flow charts for illustrating the cylinder identification processing executed upon starting of operation of a four-cylinder internal combustion engine, wherein FIG. 10 shows an interrupt processing routine (also referred to as the interrupt handling routine) activated in response to the cam pulse signal SGC, and FIGS. 11 to 14 show interrupt processing routines, respectively, which are also activated in response to the crank angle pulse signal SGT.

Referring to FIG. 10, reference symbol "Psgc(n)" denotes a number of pulses of the cam pulse signal SGC detected during a period covering the preceding crank angle pulse signal SGT and the current crank angle pulse signal SGT. On the other hand, reference symbol "Tsgt(n)" shown in FIG. 11 represents the period covering the preceding crank angle pulse signal SGT and the current crank angle pulse signal SGT.

Figure 12:
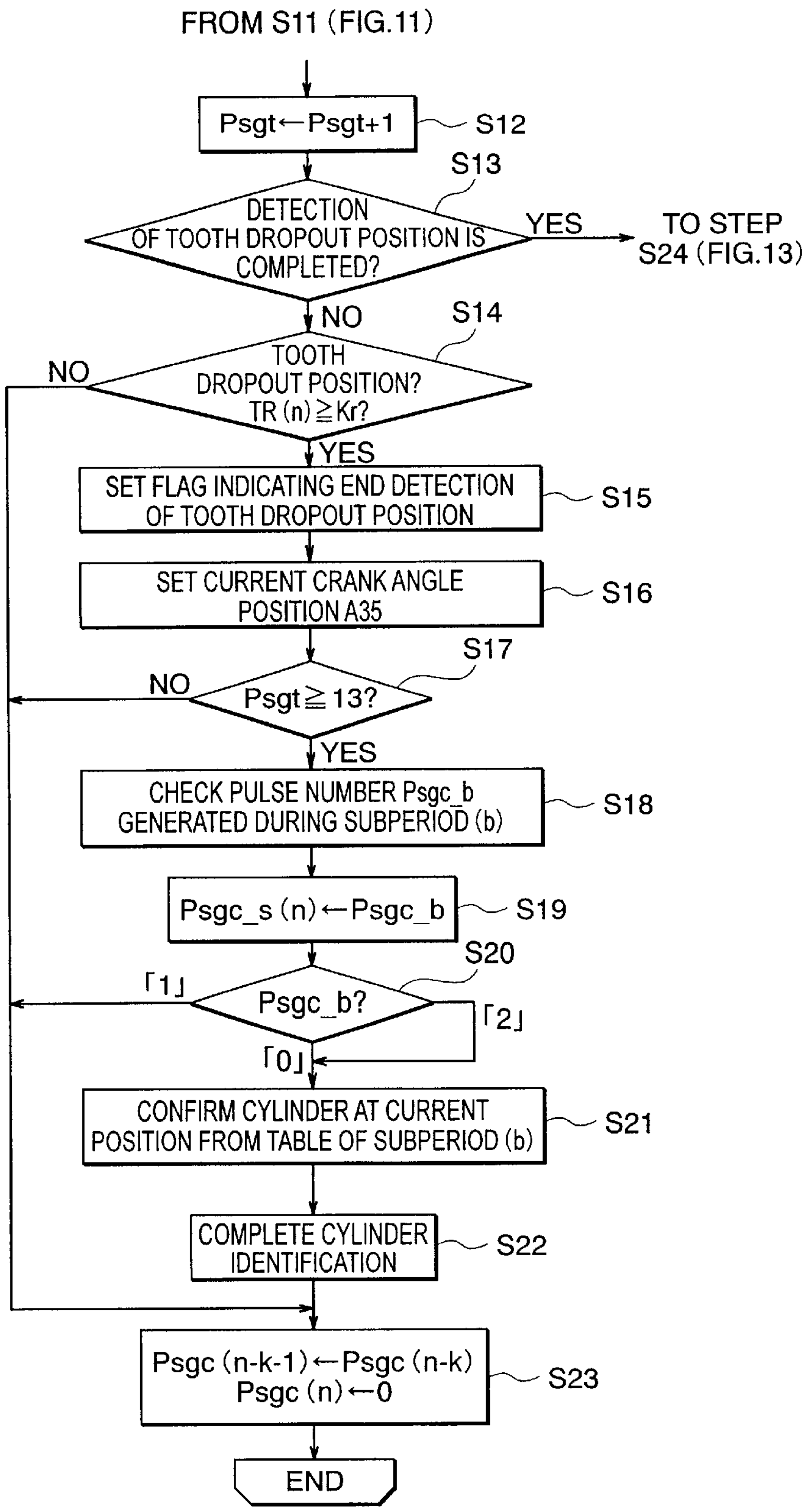
FIG. 12 is a flow chart for illustrating an interrupt processing routine executed by the cylinder identifying means in response to a crank angle pulse signal in the cylinder identifying system according to the first embodiment of the present invention.
Figure 13:
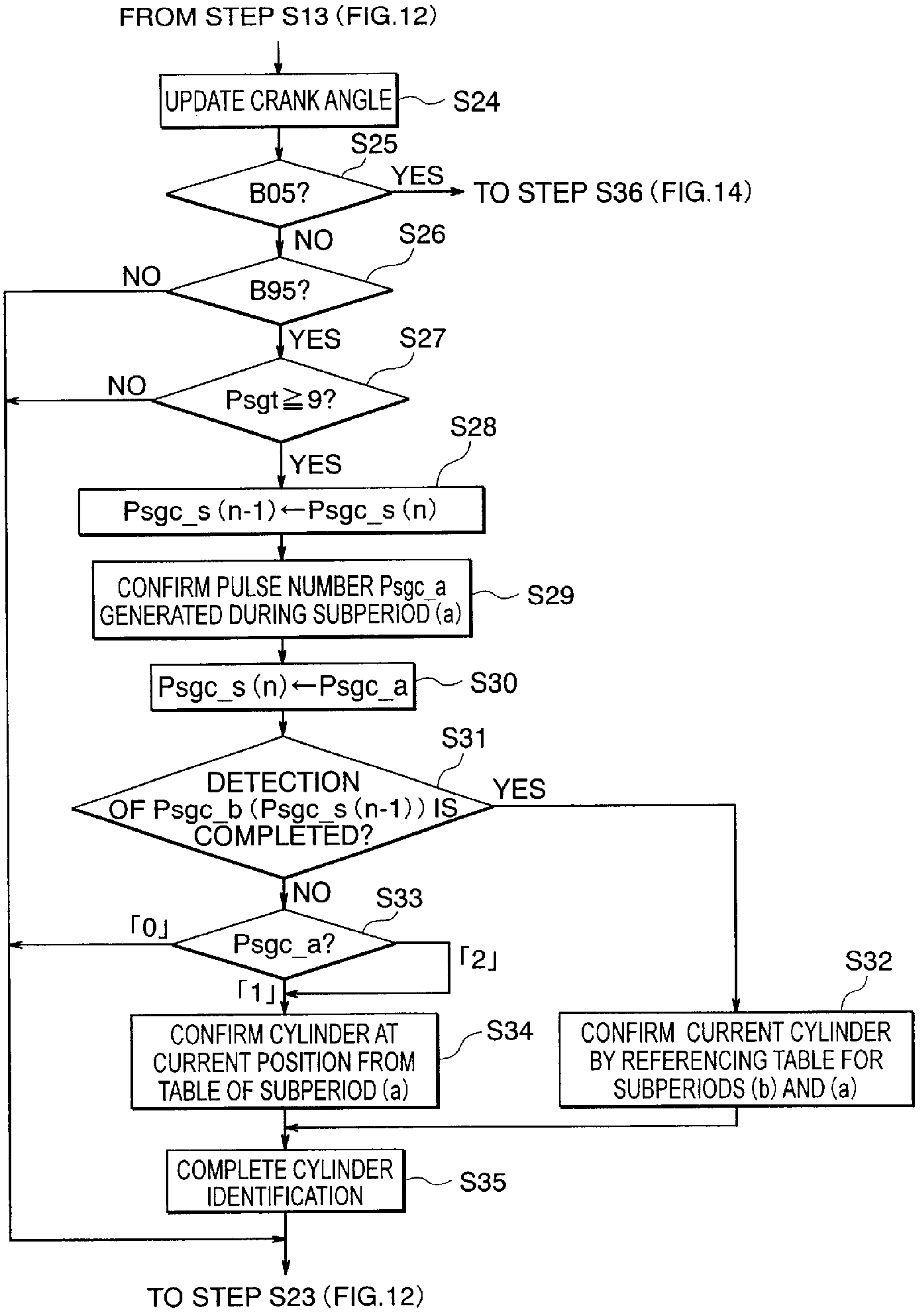
FIG. 13 is a flow chart for illustrating an interrupt processing routine executed by the cylinder identifying means in response to a crank angle pulse signal in the cylinder identifying system according to the first embodiment of the present invention.
Figure 14:
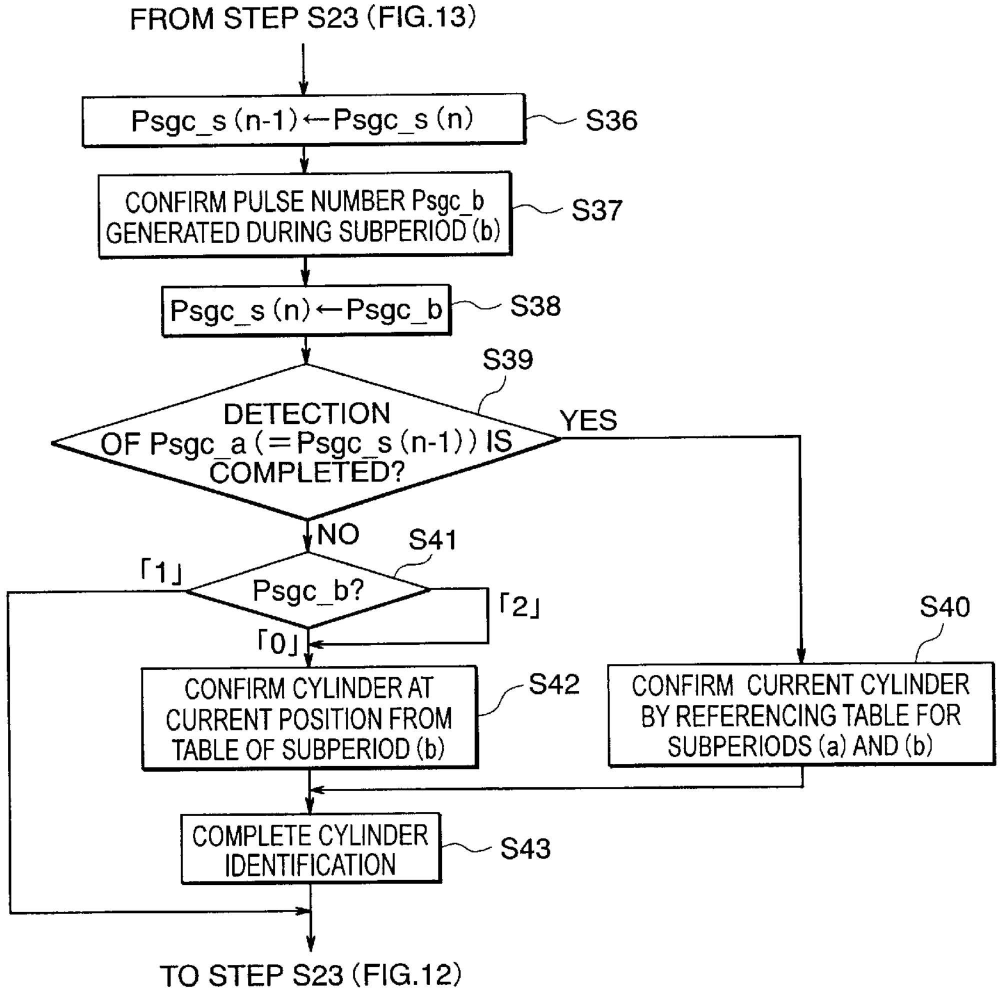
FIG. 14 is a flow chart for illustrating an interrupt processing routine executed by the cylinder identifying means in response to a crank angle pulse signal in the cylinder identifying system according to the first embodiment of the present invention.

Furthermore, in FIGS. 12 to 14, reference symbol "Psgt" denotes the number of pulses of the crank angle pulse signal SGT generated since the time point at which the pulse detection was started, reference symbol "Psgc_b" denotes a number of pulses of the cam pulse signal SGC generated during the latest subperiod (b), reference symbol "Psgc_s (n)" denotes a number of pulses of the cam pulse signal SGC generated during the current subperiod (i.e., current pulse series of the generated cam pulse signal SGC), reference symbol "Psgc_a" denotes a number of pulses of the cam pulse signal SGC generated during the latest subperiod (a), and reference symbol "Psgc_s(n)" denotes a number of pulses of the cam pulse signal SGC generated during the current pulse subperiod (i.e., current series of the generated cam pulse signal SGC).

Now referring to FIG. 10, the pulse signal sequential order storage means 11 and the pulse signal number storage means 12 respond to generation of pulse of the cam pulse signal SGC to thereby store the number Psgc(n) (=1) generated pulses of the cam pulse signal SGC in correspondence with the current pulse detection period Tsgt(n) for the crank angle pulse signal SGT (step S1).

Figure 11:
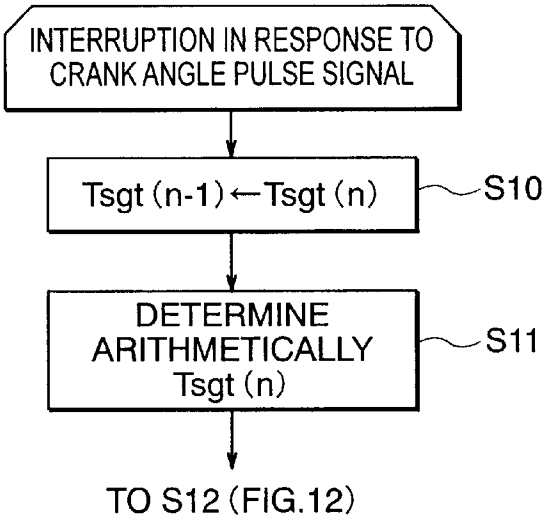
FIG. 11 is a flow chart for illustrating an interrupt processing routine executed by the cylinder identifying means in response to a crank angle pulse signal in the cylinder identifying system according to the first embodiment of the present invention.

Further, referring to FIG. 11, upon every pulse detection of the crank angle pulse signal SGT, the pulse signal sequential order storage means 11 and the pulse signal number storage means 12 shift the current pulse detection period Tsgt(n) to the preceding pulse detection period Tsgt (n−1) in a step S10 and thereafter determines arithmetically the latest pulse detection period Tsgt(n) in a step S11, whereon the processing proceeds to the processing flow shown in FIG. 12.

Referring to FIG. 12, the detected pulse number Psgt of the crank angle pulse signal SGT is incremented (counted) in a step S12, whereon decision is made as to whether or not detection of the tooth dropout position has already been completed by referencing the tooth dropout detection flag in a step S13.

When it is decided in the step S13 that the tooth dropout position has already been detected (i.e., when the decision step S13 results in affirmation "YES"), the processing makes transition to the processing flow (step S24) which will hereinafter be described by reference to FIG. 13. On the other hand, when it is decided in the step S13 that no tooth dropout position has been detected (i.e., when the decision step S13 results in negation "NO"), then decision is made as to whether or not the current crank angle position corresponds to the tooth dropout position in a step S14.

More specifically, decision is made as to whether or not the period ratio TR(n) of the crank angle pulse signal SGT determined in accordance with the expression (1) mentioned hereinbefore is greater than the predetermined value Kr inclusive. When the decision results in that TR(n)<Kr (i.e., "NO"), the processing proceeds to a step S23 which will be described later on.

On the other hand, when it is decided in the step S14 that TR(n)≧Kr (i.e., when the decision step S14 results in affirmation "YES"), the flag indicating the end of dropout tooth detection is set in a step S15, whereon the current crank angle position A35 corresponding to the position of the dropout tooth is set (step S16).

In succession, decision is made whether the number Psgt of pulses of the crank angle pulse signal SGT detected since the detection start time point up to the current time point is equal to or greater than "13" with a view to determining whether or not the signal detection has been started from the start point (B95) of the subperiod (b) or an earlier time point (step S17).

When the decision step S17 results in that Psgt<13 (i.e., negation "NO"), the processing proceeds to a step S23. On the contrary, when the decision step S17 results in that Psgt≧13 (i.e., affirmation "YES"), the number of the pulses Psgc_b of the cam pulse signal SGC generated during the subperiod (b) is verified in a step S18.

In this conjunction, the generated pulse number Psgc_b can be determined by accumulating or summing nine data values determined arithmetically in the step S1 (FIG. 10) and stored before the time point corresponding to the position B05 in accordance with the following expression (2):

$$Psgc\_b=Psgc(n-11)+Psgc(n-10)+\ldots+Psgc(n-3) \qquad (2)$$

Subsequently, the generated pulse number Psgc_b determined in accordance with the above expression (2) is stored as the generated pulse number Psgc_s(n) of the current series in a step S19, which is then followed by a decision step S20 for deciding which of the values "0", "1" and "2" the generated pulse number Psgc_b assumes.

When it is decided that Psgc_b="1" in the step S20, the processing proceeds to a step S23 because the cylinder identification is impossible on the basis of only the value "1".

On the other hand, when the decision step S20 results in that Psgc_b="0" or Psgc_b="2", the cylinder (cylinder #1 or cylinder #4) whose crank angle position is currently at A35 is confirmed for identification on the basis of the table (not shown) only for the subperiod (b) in a step S21, whereon the flag indicating the end of the cylinder identification processing is set in a step S22.

Subsequently, the generated pulse number Psgc(n−k) of the cam pulse signal SGC detected during the pulse period of the crank angle pulse signal SGT before k pulses (corresponding to magnitude of deviation of the detection start point from the subperiod start point or the end point) is shifted to the value Psgc(n−k−1) before (k+1) pulses, whereon the pulse number Psgc(n) is cleared to zero (step S23). The processing routine shown in FIG. 12 then comes to an end.

On the other hand, when it is decided in the step S13 that the tooth dropout detection end flag has already been set, indicating that detection of the tooth dropout position has already been completed (i.e., when the decision step S13 results in affirmation "YES"), then the processing proceeds to a step S24 shown in FIG. 13.

Referring to FIG. 13, in the step S24, the crank angle position is firstly updated by 10° CA (corresponding to one period) on the basis of the number of pulses of the crank angle pulse signal SGT detected since the time point corresponding to the reference position A35 to thereby confirm or verify the current crank angle position, which is then followed by a step S25 where decision is made as to whether or not the current crank angle position has reached the succeeding position B05.

When it is decided in the step S25 that the current crank angle position has reached the position B05 (i.e., when the decision step S25 results in "YES"), the processing proceeds to the routine shown in FIG. 14, as will be described hereinafter (step S36). On the other hand, unless the current crank position has reached the position B05 (i.e., when the decision step S25 results in "NO"), then it is decided in a step S26 whether or not the current crank position has reached the position B95.

In case the decision in the step S26 results in that the number of pulses of the cam pulse signal SGC detected since the position A35 is not greater than "5", indicating that the current crank position has not reached the position B95 yet (i.e., when the decision step S26 results in "NO"), the processing proceeds to the step S23 shown in FIG. 12, whereon the current processing comes to an end.

By contrast, when it is decided in the step S26 that the current crank position is B95 (i.e., when the decision step S26 results in "YES"), then decision is made as to whether or not the number (Psgt) of pulses of the crank angle pulse signal SGT detected since the start of signal detection is greater than "9" (step S27).

When it is found in the step S27 that Psgt<9 (i.e., when the decision step S27 results in "NO"), the processing proceeds to the step S23 shown in FIG. 12. Thus, the current processing comes to an end.

On the other hand, when the decision step S27 results in that Psgt≧9 (i.e., "YES"), the generated pulse number Psgc_s(n) of the current cam pulse signal SGC is shifted to the preceding value Psgc_s(n−1) in a step S28, whereon the pulse number Psgc_a of the cam pulse signal SGC generated during the subperiod (a) is verified in a step S29.

In this conjunction, the generated pulse number Psgc_a can be determined by accumulating or summing seven data values determined arithmetically in the step Si (FIG. 10) and stored before the time point corresponding to the position B95 in accordance with the following expression (3):

$$Psgc\_a = Psgc(n-7) + Psgc(n-6) + \dots + Psgc(n-1) \tag{3}$$

Subsequently, the generated pulse number Psgc_a determined in accordance with the above expression (3) is stored as the current series of generated pulse number Psgc_s(n) in a step S30, whereon it is decided in a step S31 whether or not detection of the pulse number Psgc_b generated during the preceding latest subperiod (b) (i.e., the preceding series of value Psgc_s(n−1)) has been terminated.

When it is decided in the step S31 that detection of the pulse number Psgc_b generated during the subperiod (b) has already been terminated (i.e., when the decision step S31 results in "YES"), the cylinder proper to the current crank angle position is confirmed or verified on the basis of combination of the generated pulse number Psgc_b and the number of pulses generated during the current subperiod (a), i.e., pulse number Psgc_a, by referencing the cylinder identification table for the subperiods (b) and (a) in a step S32 (see FIG. 6), whereon the processing proceeds to a step S35 described later on.

On the contrary, when it is decided in the step S31 that detection of the pulse number Psgc_b generated during the preceding subperiod (b) has not been completed yet (i.e., when the decision step S31 results in "NO"), decision is then made as to which of the values of "0", "1" and "2" the number of pulses Psgc_a generated during the current subperiod (a) assumes (step S33).

When it is decided that Psgc_a="0" in the step S33, the processing proceeds to the step S23 shown in FIG. 12 because the cylinder identification is impossible on the basis of only the value "0", whereon the processing comes to an end.

On the other hand, when the decision step S33 results in that Psgc_a="1" or Psgc_a="2", the cylinder (cylinder #1 or cylinder #3) whose crank angle position is currently B95 is confirmed for identification on the basis of the table (not shown) only for the subperiod (a) in a step S34, whereon the flag indicating the end of the cylinder identification processing is set in a step S35. In succession, the processing proceeds to the step S23 shown in FIG. 12.

On the other hand, when it is decided in the step S25 that the current crank angle position is B05, (i.e., when the decision step S25 results in "YES"), then the processing proceeds to a step S36 shown in FIG. 14.

Referring to FIG. 14, the current series of the generated pulse number Psgc_s(n) of the cam pulse signal SGC is firstly shifted to the preceding value Psgc_s(n−1) in the step S36, whereon the pulse number Psgc_b of the cam pulse signal SGC generated during the subperiod (b) is verified in a step S37.

In this conjunction, the generated pulse number Psgc_b can be determined by accumulating or summing nine data values determined arithmetically in the step Si (FIG. 10) and stored before the time point corresponding to the position B05 in accordance with the following expression (4):

$$Psgc\_b = Psgc(n-8) + Psgc(n-7) + \dots + Psgc(n) \tag{4}$$

Subsequently, the generated pulse number Psgc_b determined in accordance with the above expression (3) is stored as the current series of generated pulse number Psgc_s(n) in a step S38, whereon it is decided in a step S39 whether or not detection of the pulse number Psgc_a generated during the preceding latest subperiod (a) (i.e., the preceding series of value Psgc_s(n−1)) has been completed.

When it is decided in the step S39 that detection of the pulse number Psgc_a generated during the subperiod (a) has already been completed (i.e., when the decision step S39 results in "YES"), the cylinder proper to the current crank angle position is confirmed or verified on the basis of combination of the generated pulse number Psgc_a and the number of pulses generated during the current subperiod (b), i.e., pulse number Psgc_b, by verifying the cylinder identification table for the subperiods (a) and (b) in a step S40 (see FIG. 4), whereon the processing proceeds to a step S43 described later on.

On the contrary, when it is decided in the step S39 that detection of the pulse number Psgc_a generated during the preceding subperiod (a) has not been completed yet (i.e., when the decision step S39 results in "NO"), decision is then made as to which value of "0". "1" and "2" the number of pulses Psgc_b generated during the current subperiod (b) is (step S41).

When it is decided that Psgc_b "1" in the step S41, the processing proceeds to the step S23 shown in FIG. 12 because the cylinder identification is impossible on the basis of only the value "1", whereon the processing comes to an end.

On the other hand, when the decision step S41 results in that Psgc_b="0" or Psgc_b="2", the cylinder (cylinder #1 or cylinder #4) whose crank angle position is currently B05 is confirmed for identification on the basis of the table (not shown) only for the subperiod (b) in a step S42, whereon the flag indicating the end of the cylinder identification processing is set (step S43). In succession, the processing proceeds to the step S23 shown in FIG. 12.

As is apparent from the foregoing, according to the teachings of the present invention incarnated in the first embodiment thereof, the cylinder identification can be achieved during a shorter period crank angle rotation than the conventional system independently of the signal detection start timing upon starting of engine operation on the basis of the number of pulses of the cam pulse signal SGC generated during only the subperiod (a) or subperiod (b) or the combination of the pulse numbers generated during the subperiods (a) and (b) in this order or the combination of the pulse numbers generated during the subperiods (b) and (a).

By way of example, when the crank angle pulse signal SGT has been detected from a time point before the start point of the preceding subperiod (b) upon detection of the reference position A35, it can be determined that the current cylinder is the cylinder #4 on the basis of the pulse number "2" of the cam pulse signal SGC generated during the preceding subperiod (b).

Further, when the crank angle pulse signal SGT has been detected from a time point preceding to the start point of the current subperiod (a) upon detection of the end point of the current subperiod (a) including the position A35 in succession to the detection of the reference position A35, the cylinder #1 or cylinder #3 can be identified in dependence on the pulse number "1" or "2" of the cam pulse signal SGC generated during the current subperiod (a).

Furthermore, when the crank angle pulse signal SGT has been detected from a time point before the start point of the preceding subperiod upon detection of the end points of plural subperiods successively, the cylinder identification can be realized on the basis of the combination of the pulse numbers of the cam pulse signal SGC generated during the preceding subperiod and the current subperiod, respectively.

In other words, by discriminating the subperiod in which the reference position A35 is included and determining speedily whether detection of the pulses of the cam pulse signal SGC has been started before the start point of the subperiod (a) or the subperiod (b) upon detection of the reference position A35 (tooth dropout position) of the crank angle pulse signal SGT, the cylinder identification can be accomplished swiftly on the basis of the number of pulses of the cam pulse signal SGC generated during the determined or confirmed subperiods or combination thereof.

Thus, the cylinder identification can be performed immediately upon termination of the detection period including plural subperiods required for the cylinder identification. This means that the range of the crank angle and thence the time taken for the cylinder identification can be reduced with the time duration of the engine starting operation up to transition to the ordinary ignition control mode being shortened correspondingly.

In this conjunction, it should be noted that correspondences between the combinations of the generated pulse numbers ("0", "1" and "2") of the cam pulse signal SGC and the individual cylinders can be established with high reliability because the pulse number combinations are so set as to differ from one to another subperiod, as can be seen in FIG. 2.

Furthermore, owing to the arrangement such that the generated pulse number combination of "0" and "0" of the cam pulse signal SGC can never occur during the plural subperiods for cylinder identification, erroneous or false cylinder identification can be evaded even upon occurrence of a fault such as wire breakage, whereby the fail-safe function can be protected from being impaired.

Parenthetically, in the case where the cylinder identification is performed on the basis of the table data only for the subperiod (b) (see FIG. 12, steps S20 and 21), identification of the proper cylinder can be validated in the case where the pulse number Psgc_b of the cam pulse signal SGC generated during the subperiod (b) is "0" or alternatively "2". By contrast, when the pulse number Psgc_b is "0", discrimination from the wire breakage fault is rendered impossible. Accordingly, in this case, the cylinder identification processing may be so arranged as to be inhibited.

It should further be added that since the sequential relation of the timings at which the crank angle pulse signal SGT and the cam pulse signal SGC are generated are stored as the history data in the storage means 11 and 12 incorporated in the cylinder identifying means 10 together with the detected pulse numbers of the crank angle pulse signal SGT and the cam pulse signal SGC from the time point when the engine operation is started, high reliability can be ensured for the cylinder identification.

Besides, because the crank angle pulse signal SGT is represented by a pulse train in which individual pulses make appearance periodically at an interval corresponding to 10° CA, the crank angle positions designated discriminatively by the individual pulses can be determined with high accuracy, ensuring enhanced reliability and accuracy for cylinder control.

Additionally, owing to the feature that the reference position indicated by the pulse included in the crank angle pulse signal SGT is set at the crank angle of A35 and that the tooth dropout position is set at the position corresponding to the crank angle of tooth dropout position A25 which bears low degree of relevancy to the engine control reference position, any appreciable influence will never be exerted to the control of the individual cylinder operations.

Finally, it should be added that the number of divisions of the TDC period as well as the order of the generated pulse numbers of the cam pulse signal SGC on the subperiod basis is never restricted to the example illustrated in FIG. 2 but may be so arranged that the generated pulse number of the cam pulse signal SGC differs from one to another cylinder. In other words, the cylinder discrimination can be realized within a short time as in the case of the illustrated embodiment by adopting the pulse number combination of the cam pulse signals appropriate for a given number of the subperiods, needless to say.

Embodiment 2

The foregoing description directed to the first embodiment of the present invention has been made on the presumption that the invention is applied to the four-cylinder internal combustion engine. A second embodiment of the present invention is concerned with the cylinder identifying system which can be applied to a six-cylinder internal combustion engine substantially to the same advantageous effect.

Figure 15:
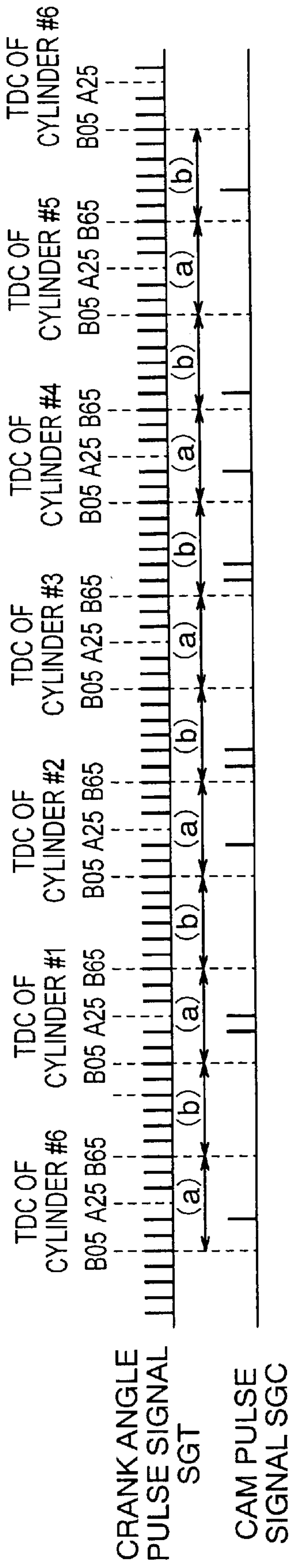
FIG. 15 is a timing chart showing signal patterns of a crank angle pulse signal and a cam pulse signal generated in an internal combustion engine having six-cylinders according to a second embodiment of the present invention.

FIG. 15 is a timing chart showing pulse generation patterns of the crank angle pulse signal SGT and the cam pulse signal SGC generated in the cylinder identifying system according to the second embodiment of the invention applied to the six-cylinder engine. Referring to FIG. 15, the tooth dropout position is set at the crank position A25, as in the case of the first embodiment. However, in the six-cylinder internal combustion engine, the TDC period (i.e., ignition control subperiod) extends over 120° CA. Consequently, the subperiod (a) ranges from B05 to B65° CA (hereinafter referred simply to as the "B65") while the subperiod (b) ranges from B65 to B05.

FIG. 16 is a timing chart for illustrating, by way of example, the cylinder identifying operation carried out by the cylinder identifying system according to the instant embodiment of the present invention on the presumption that the detection of the crank angle pulse signal SGT has been started from a time point immediately preceding to the start point (B05) of the subperiod (a).

FIG. 17 is a view showing a cylinder identification table to be referenced in conjunction with the signal detection pattern illustrated in FIG. 16. As can be seen in FIG. 17, it is presumed that the signal detection is started from the position B05 of the cylinder #6 for determining discriminatively the crank position B05 for the cylinder #1 on the basis of combination of the numbers of the pulses "1" and "0" generated during the subperiods (a) and (b), respectively, at the time point when the succeeding crank position B05 is detected.

The signal detection pattern sown in FIG. 16 differs from that shown in FIG. 3 only in the respect that the TDC period extends over 120° CA. Except for this, the basic cylinder identifying operation is essentially same as that of the cylinder identifying system according to the first embodiment of the invention described hereinbefore. Accordingly, detailed description of the cylinder identifying operation of the cylinder identifying system according to the instant embodiment of the present invention will be unnecessary. It should however be noted that the time taken for the cylinder identification corresponds to the crank rotation angle of 120° CA.

FIG. 18 is a timing chart for illustrating another example of the cylinder identifying operation carried out by the cylinder identifying system according to the instant embodiment of the present invention on the presumption that the detection of the crank angle pulse signal SGT has been started from a time point immediately preceding to the start point (B65) of the subperiod (b).

FIG. 19 is a view showing a cylinder identification table to be referenced in conjunction with the signal detection pattern illustrated in FIG. 18. As can be seen in FIG. 19, it is presumed that the signal detection is started from the position B65 of the cylinder #2 for determining discriminatively the crank position B65 for the cylinder #3 on the basis of combination of the numbers of the pulses "0" and "1" generated during the subperiods (b) and (a), respectively, at the time point when the succeeding crank position B65 is detected. Also in the case of the signal detection pattern shown in FIG. 18, the time taken for the cylinder identification corresponds to the crank rotation angle of 120° CA.

FIG. 20 shows a timing chart in the case where the crank angle pulse signal SGT has been detected immediately after the start point (B55° CA) of the subperiod (b). In the case of the example illustrated in FIG. 20, the number of pulses generated during the first subperiod (b) can not be checked or confirmed. Nevertheless, it is possible to identify the position B05 of the cylinder #4 on the basis of the numbers of pulses "0" and "2" generated during the succeeding subperiods (a) and (b) by referencing the table illustrated in FIG. 17. In this case, the time involved for the cylinder identification corresponds to the crank rotation angle of 180° CA.

Further, FIG. 21 shows a timing chart in the case where the crank angle pulse signal SGT has been detected immediately after the start point (A05° CA) of the subperiod (a). In the case of the example illustrated in FIG. 21, the number of pulses generated during the first subperiod (a) can not be checked or confirmed. Nevertheless, it is possible to identify the position B65 of the cylinder #6 on the basis of the numbers of pulses "1" and "0" generated during the succeeding subperiods (b) and (a) by referencing the table illustrated in FIG. 19. Also in this case, the time involved for the cylinder identification corresponds to the crank rotation angle of 180° CA.

Further, FIG. 22 is a view showing, by way of example, a table employed for reference in the ordinary cylinder identification. In this ordinary cylinder identification, the numbers of pulses generated during the subperiod (a) and the subperiod (b) are totalized on a cylinder-by-cylinder basis, whereon the cylinder identification is performed by referencing the generated pulse number of the cam pulse signal SGC during the TDC subperiod.

Embodiment 3

In the case of the second embodiment of the present invention, the cylinder identifying system is applied to the six-cylinder internal combustion engine. A third embodiment of the present invention is directed to the cylinder identifying system applied to a three-cylinder internal combustion engine for realizing the similar advantageous effects as those mentioned hereinbefore.

Figure 23:
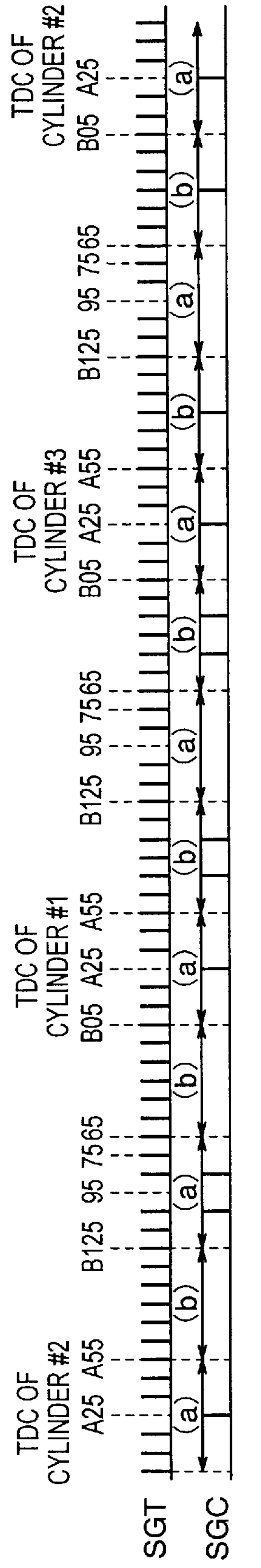
FIG. 23 is a timing chart showing signal patterns of a crank angle pulse signal and a cam pulse signal generated in a three-cylinder engine according to a third embodiment of the present invention.

FIG. 23 is a timing chart showing pulse generation patterns of the crank angle pulse signal SGT and the cam pulse signal SGC generated in the cylinder identifying system according to the third embodiment of the invention applied to the three-cylinder engine. Referring to FIG. 23, the tooth dropout position is set at the crank position A25, as in the case of the first and second embodiments. However, in the three-cylinder internal combustion engine, the TDC period (i.e., ignition control subperiod) extends over 240° CA.

Since multiplication of the TDC period by an integral number does not result in 360° CA, substantially same crank angle pulse signal SGT as that employed in the cylinder identifying system for the six-cylinder engine described in conjunction with the second embodiment of the invention is employed, wherein the tooth dropout position is set at A25 and B95, respectively.

More specifically, in the cylinder identifying system for the three-cylinder engine, it is impossible to set one reference position for each cylinder during one cycle (720° CA) of the engine. Accordingly, a pair of tooth dropout positions A25 and B95 are set for every TDC period (240° CA).

In this case, each TDC period is divided into two subperiods, i.e., subperiod (a); subperiod (b).

FIGS. 24 and 25 are views showing cylinder identification tables referenced in operation of the cylinder identifying system according to the instant embodiment of the present invention.

The table shown in FIG. 24 is employed for reference in performing the cylinder identification on the basis of the generated pulse number of the cam pulse signal SGC during the subperiod (a) and subperiod (b), wile the table shown in FIG. 25 is employed for reference in performing the cylinder identification on the basis of the generated pulse number of the cam pulse signal SGC during the subperiod (b) and subperiod (a).

Now, it can be seen that the cylinder can be identified at an earlier time point regardless of the position of the detection starting crank angle in the engine start operation mode, whereby the time taken for stating the engine operation can be shortened. In other words, engine starting performance can significantly be enhanced.

Furthermore, through the plural subperiods employed for the cylinder identification, the combinations of the pulse numbers generated for every subperiods over the plural subperiods used for the cylinder identification can never assume "0" and "0". Thus, it can be said that the cylinder identifying system according to the instant embodiment of the invention is excellent in respect to fail-safe performance.

Many features and advantages of the present invention are apparent from the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

Accordingly, all suitable modifications and equivalents may be resorted to, falling within the spirit and scope of the invention.

What is claimed is:

1. A cylinder identifying system for an internal combustion engine, comprising:

crank angle signal detecting means for generating a crank angle pulse signal composed of pulse trains each containing a reference position in synchronism with rotation of a crank shaft of said internal combustion engine;

a cam shaft rotating at a speed corresponding to one half of that of said crank shaft;

cam signal detecting means for generating a cam pulse signal including specific pulses identifying individual cylinders, respectively, of said internal combustion engine in synchronism with rotation of said cam shaft; and cylinder identifying means for identifying said individual cylinders, respectively, of said internal combustion engine on the basis of said crank angle pulse signal and said cam pulse signal, wherein said cylinder identifying means includes:

pulse signal number storage means for dividing an ignition control period for each of said individual cylinders into a plurality of subperiods for thereby counting for storage signal numbers of said specific pulses generated during said plurality of subperiods, respectively; and subperiod discriminating means for determining discriminatively a sequential order of said plural subperiods on the basis of combinations of the signal numbers of said specific pulses generated during said plural subperiods, respectively, wherein said combinations of the signal numbers of said specific pulses generated during said plural subperiods differ from one to another correspondingly to said plural subperiods in dependence on start points of said plural subperiods, respectively, and wherein said cylinder identifying means is so designed as to identify said individual cylinders on the basis of results of said discriminative determination of said subperiods performed by said subperiod discriminating means independently of the start points of said plural subperiods.

2. A cylinder identifying system for an internal combustion engine according to claim 1, wherein said pulse signal number storage means is so designed as to count for storage the numbers of pulses of said cam pulse signal and said crank angle pulse signal, respectively, from the start of operation of said internal combustion engine, wherein said cylinder identifying means includes:

pulse signal sequential order storage means for storing therein temporal relations between said pulse trains of said crank angle pulse signal and said specific pulses of said cam pulse signal; and reference position detecting means for detecting said reference position from said crank angle pulse signal, wherein when it is decided that said crank angle pulse signal has been detected since a start point of a preceding one of said plural subperiods at the latest on the basis of the number of pulses of said crank angle pulse signal which have been stored up to said reference position, said cylinder identifying means identifies said individual cylinders on the basis of the signal number of said cam pulse signal(s) generated during said preceding subperiod.

3. A cylinder identifying system for an internal combustion engine according to claim 2, wherein when decision is made after detection of said reference position that said crank angle pulse signal has been detected since the start point of a current one of said plural subperiods at the latest on the basis of the pulse number of said crank angle pulse signal stored up to a time point at which an end point of said current subperiod including said reference position is detected, said cylinder identifying means identifies the individual cylinders on the basis of the signal number of said cam pulse signal(s) generated during said current subperiod.

4. A cylinder identifying system for an internal combustion engine according to claim 2, wherein when it is decided on the basis of the pulse number of said crank angle pulse signal stored up to a subperiod end point of said plural subperiods that said crank angle pulse signal has been detected since the start point of said preceding subperiod at the latest, said cylinder identifying means identifies said individual cylinders on the basis of combination of the signal number of said cam pulse signal(s) generated during the preceding subperiod and the signal number of said cam pulse signal(s) generated during the current subperiod.

5. A cylinder identifying system for an internal combustion engine according to claim 1, wherein combination of signal numbers of said cam pulse signal(s) generated during said plural subperiods contains no combination of only “0s” which indicates absence of output.

6. A cylinder identifying system for an internal combustion engine according to claim 5, wherein number of the cylinders of said internal combustion engine is four with the ignition control period for each of said cylinders being so set as to correspond to a crank angle of 180°, said plural subperiods being constituted by a first subperiod and a second subperiod, and wherein numbers of said specific pulses contained in said cam pulse signal generated during said first subperiod and said second subperiod, respectively, are “1” and “0”, “2” and “1”, “0” and “2” and “0” and “1”, respectively, in the order in which said cylinders are to be controlled.

7. A cylinder identifying system for an internal combustion engine according to claim 6, wherein said crank angle pulse signal is composed of pulse trains each of a period corresponding to a crank angle of 10°, and wherein said reference position included in said crank angle pulse signal is set at a crank angle of 35° from a top dead center on a cylinder-by-cylinder basis.

8. A cylinder identifying system for an internal combustion engine according to claim 5, wherein number of the cylinders of said internal combustion engine is six with the ignition control period for each of said cylinders being so set as to correspond to a crank angle of 120°, said plural subperiods being constituted by a first subperiod and a second subperiod, and wherein numbers of said specific pulses contained in said cam pulse signal generated during said first subperiod and said second subperiod, respectively, are “1” and “0”, “2” and “0”, “1” and “2”, “0” and “2”, “1” and “1” and “0” and “1”, respectively, in the order in which said cylinders are to be controlled.

9. A cylinder identifying system for an internal combustion engine according to claim 5, wherein number of the cylinders of said internal combustion engine is three with the ignition control period for each of said cylinders being so set as to correspond to a crank angle of 240°, said plural subperiods being constituted by a first subperiod and a second subperiod, and wherein numbers of said specific pulses contained in said cam pulse signal generated during said first subperiod and said second subperiod, respectively, are "1" and "0", "2" and "0", "1" and "2", "0" and "2", "1" and "1" and "0" and "1", respectively, in the order in which said cylinders are to be controlled.

* * * * *